(12) United States Patent
Chen et al.

(10) Patent No.: US 12,309,614 B1
(45) Date of Patent: May 20, 2025

(54) SYSTEM AND METHOD FOR CONTROLLING ELECTROMAGNETIC RADIATION IN A GEOGRAPHICAL AREA

(71) Applicant: University of South Florida, Tampa, FL (US)

(72) Inventors: Kwang-Cheng Chen, Lutz, FL (US); Mehmet Mert Sahin, Tampa, FL (US); Huseyin Arslan, Tampa, FL (US); Gokhan Mumcu, Tampa, FL (US)

(73) Assignee: University of South Florida, Tampa, FL (US)

( * ) Notice: Subject to any disclaimer, the term of this patent is extended or adjusted under 35 U.S.C. 154(b) by 381 days.

(21) Appl. No.: 17/895,283

(22) Filed: Aug. 25, 2022

Related U.S. Application Data

(60) Provisional application No. 63/236,866, filed on Aug. 25, 2021.

(51) Int. Cl.
*H04W 16/28* (2009.01)
*H04B 7/145* (2006.01)
*H04W 16/14* (2009.01)
*H04W 16/18* (2009.01)

(52) U.S. Cl.
CPC ............ *H04W 16/28* (2013.01); *H04B 7/145* (2013.01); *H04W 16/14* (2013.01); *H04W 16/18* (2013.01)

(58) Field of Classification Search
CPC ..... H04W 16/14; H04W 16/18; H04W 16/28; H04B 7/145
USPC ........................................................ 455/448
See application file for complete search history.

(56) References Cited

U.S. PATENT DOCUMENTS

2018/0196974 A1* 7/2018 Hunziker ........... G06K 7/10316

OTHER PUBLICATIONS

Alper Bereketli et al. "Communication Coverage in Wireless Passive Sensor Networks" IEEE Communications Letters, Feb. 2009. pp. 133-135, vol. 13 No. 2.
Ezio Biglieri et al. "Fading Channels: Information-Theoretic and Communications Aspects" IEEE Transactions On Information Theory. Oct. 1998, pp. 2619-2692, vol. 44, No. 6.
Emil Bjornson et al. "Massive MIMO Networks: Spectral, Energy, and Hardware Efficiency" Foundations and Trends R in Signal Processing. 2017. pp. 154-655, vol. 11, No. 3-4.
Mohamed A. ElMossallamy et al. "Noncoherent Backscatter Communications Over Ambient OFDM Signals" IEEE Transactions On Communications. May 2019, pp. 3597-3611. vol. 67, No. 5.
Xiaohu Ge et al. " Spatial Spectrum and Energy Efficiency of Random Cellular Networks" IEEE Transactions On Communications. Mar. 2015, pp. 1019-1030. wol. 63, No. 3.
Huayan Guo et al. "Cooperative Ambient Backscatter System: A Symbiotic Radio Paradigm for Passive IoT" IEEE Wireless Communications Letters. Aug. 2019. pp. 1191-1194, vol. 8, No. 4.

(Continued)

*Primary Examiner* — Joel Ajayi
(74) *Attorney, Agent, or Firm* — Molly L. Sauter; Smith & Hopen, P.A.

(57) ABSTRACT

System and method for controlling electromagnetic spatial radiation over a region by coordination the utilization of multiple ambient backscatter (ABC) nodes and repositionable dynamic reconfigurable intelligent surfaces (RISs). Multiple coordinated ABCs are used to protect the region of primary use against the radiation due to the secondary users. Repositionable dynamic RISs provide more robustness to shadowing and power fluctuations in short time frame.

16 Claims, 10 Drawing Sheets

(56) References Cited

OTHER PUBLICATIONS

Huayan Guo et al. " Cognitive Backscatter Network: A Spectrum Sharing Paradigm for Passive IoT" IEEE Wireless Communications. Oct. 2019, pp. 1423-1426. vol. 8, No. 5.
Wahab Khawaja et al. "Coverage Enhancement for NLOS mmWave Links Using Passive Reflectors" IEEE Open Journal of the Communications Society. 2020, pp. 263-281. vol. 1.
Shao-Yu Lien et al. "Cognitive Radio Resource Management for Future Cellular Networks" IEEE Wireless Communications. Feb. 2014, pp. 70-79.
Vincent Liu et al. "Ambient Backscatter: Wireless Communication Out of Thin Air" Aug. 2013, chrome-extension://efaidnbmnn-nibpcajpcglclefindmkaj/https://modernmobile.cs.washington.edu/docs/abc.pdf.
Wanchun Liu et al. "Backscatter Multiplicative Multiple-Access Systems: Fundamental Limits and Practical Design" IEEE Transactions On Wireless Communications. Sep. 2018. pages 5713-5728. vol. 17, No. 9.
Alphan Sahin et al. "A Survey on Multicarrier Communications: Prototype Filters, Lattice Structures, and Implementation Aspects" IEEE Communications Surveys & Tutorials. 2014, pp. 1312-1338. vol. 16, No. 3.
Nguyen Van Huynh et al. "Ambient Backscatter Communications: A Contemporary Survey" IEEE Communications Surveys & Tutorials. 2018, pp. 2889-2922. vol. 20, No. 4.
AWMF-0108 Beamformer IC, Anokiwave. https://www.anokiwave.com/products/awmf-0108/index.html, Accessed Nov. 28, 2022.

* cited by examiner

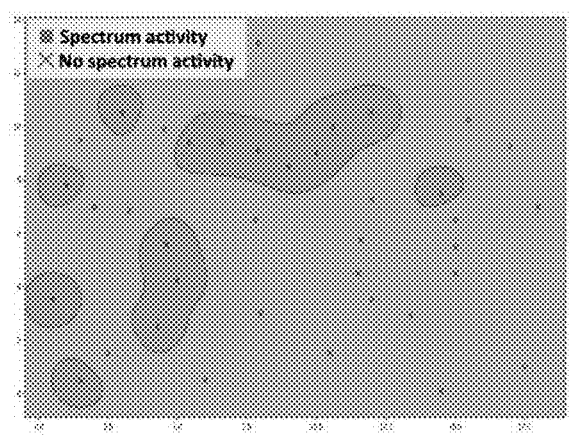 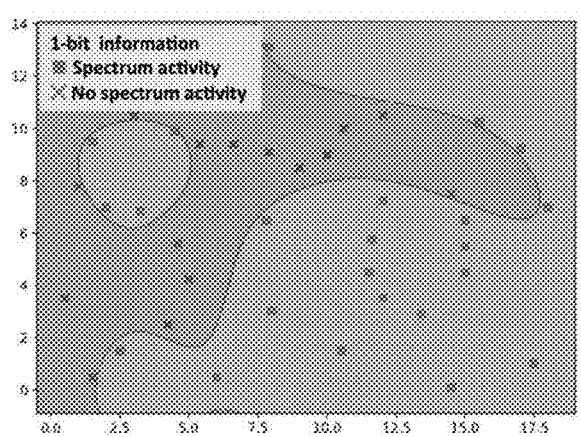
FIG. 10A                    FIG. 10B

SYSTEM AND METHOD FOR CONTROLLING ELECTROMAGNETIC RADIATION IN A GEOGRAPHICAL AREA

CROSS-REFERENCE TO RELATED APPLICATIONS

This application claims priority to U.S. Provisional Patent Application No. 63/236,866 entitled, "SYSTEM AND METHOD FOR ENABLING SPATIAL SPECTRUM EFFICIENCY OF COEXISTING SMART AND RECONFIGURABLE RADIOS", filed on Aug. 25, 2021, the entirety of which is incorporated herein by reference.

FEDERALLY SPONSORED RESEARCH OR DEVELOPMENT

This invention was made with government support from the U.S. National Science Foundation under Award ECCS-1923857. The government has certain rights in the invention.

BACKGROUND OF THE INVENTION

Efficient spectrum utilization is always the fundamental challenge of mobile communication technology toward 6G. Instead of conventional spectral efficiency in bps/Hz, geographical region shall be brought into consideration in bps/Hz/unit-area, which suggests spatial domain technology as a generalization of conventional multiple-input-multiple-output (MIMO) to elevate next generation mobile communication technology.

The 5G wireless network is proposed to enable three imperative service applications, including massive machine type communications (mMTC), enhanced-mobile broadband (eMBB), and ultra-reliable and low latency communications (uRLLC). With the recent developments on key 5G technologies such as massive MIMO, polar coding, cloud radio access network (C-RAN), and so on, the theoretical gain is achieved to be validated by the field test. However, as intelligence, autonomy and ubiquity of the digital word exponentially grows, 5G wireless networks will not be adequate to meet high demand of future applications that require the connection of everything consisting of people, vehicles, unmanned aerial vehicles (UAVs), satellites, sensors, data clouds, computing devices and robotic agents.

It is expected that 6G wireless networks will fulfill the fully connected digital world and provide ubiquitous wireless connectivity for all. It will open a new era of Internet of intelligence with connected everything. With the emergence of holographic teleportation, increased industrial automation and connection density, next generation 6G systems are needed to provide 1 Terabit per second-level data rates, microsecond-level latency, and improved energy efficiency. Also, the industrial Internet of Things (IIoT) concept requires wireless networks that guarantee spatial reconfigurability and ultra-reliability. With the diverse requirements of emerging applications and use cases, 6G systems are projected to enhance the awareness of the whole communication network including the wireless medium and endpoints. Such a massively connected network needs to have the capabilities of real-time learning and data processing for network edges, air interface and user elements that can be enabled via machine learning (ML).

The increase in the number of wireless devices, which is expected to reach 125 billion devices all over the world by 2030, and the goal of 1 Gb/s/m2 area traffic capacity further boosts the importance of spectrum utilization for the next generation wireless systems in the highly overloaded coexisting scenarios. Also, current wireless communication systems cannot provide services to half of the world's population living in remote areas where next generation systems are planned to guarantee at least 10 Mbps by extending the coverage area. Therefore, the electromagnetic radiation emitting from numerous wireless devices serving various applications needs to be controlled intelligently both at the transceiver ends and along the wireless medium.

Accordingly, what is needed in the art is an improved system and method for controlling electromagnetic radiation within a geographical area for coexisting smart radio environments.

SUMMARY OF INVENTION

In various embodiments, the present invention provides a smart radio environment which considers efficient utilization of the radio spectrum in any given geographical area, which can also be viewed as a generalization of cognitive radio technology. By smart management of reconfigurable intelligent surface (RIS) and ambient backscatter communication (ABC) technologies, a smart radio environment can be formed in any given area to achieve spectral-spatial efficiency.

In accordance with the present invention, control of electromagnetic spatial radiation over a region is explored by utilizing repositionable dynamic RISs and harmony of multiple ABC nodes assisted with a machine learning (ML) based control mechanism to form a spectrum map. Such smart and reconfigurable radio technology demonstrates the superiority of mutual usage of RIS and ABC in terms of shaping the electromagnetic energy in coexisting radio systems. First, the use of multiple RISs is introduced to enhance the capacity of the secondary use inside the specific area by shaping the electromagnetic energy in the spatial domain. Secondly, a new degree of freedom with repositionable dynamic RIS is introduced. Controlling the time varied shadowing effects by re-positioning the RISs, it is shown that 15% more capacity can be achieved. Finally, the use of multiple coordinated ABCs to protect the region of primary use against the radiation due to the secondary uses is investigated. Having coordinated network with repositionable dynamic RIS and multiple ABCs allow the electromagnetic wave to be shaped in the spatial domain by creating radiation rejection and coverage extension zones. A centralized or distributed mechanism to construct the spectrum map based on ABC sensors is also introduced to instruct existing repositionable dynamic RISs for better coverage. Merging these promising technologies will pave the way for the smart radio environment creating high spectral efficient wireless systems.

In one embodiment, the present invention provides a method for controlling electromagnetic radiation in a geographical area. The method includes positioning a primary wireless system and a secondary wireless system in a geographical area, operating the primary wireless system to generate a primary electromagnetic signal for a primary use region of the geographical area and operating the secondary wireless system to generate a secondary electromagnetic signal for a secondary use region of the geographical area. The method further includes operating a plurality of ambient backscatter communication (ABC) nodes to create a radiation rejection zone within the primary use region, wherein the ABC nodes reduce the interference from the secondary electromagnetic signal in the radiation rejection zone.

In a particular embodiment, the method may further include positioning one or more repositionable dynamic reconfigurable intelligent surfaces (RISs) in the geographical area and operating the one or more repositionable dynamic RISs to create a coverage extension zone for the secondary electromagnetic signal within the secondary use region. A spectrum map may be constructed utilizing the plurality of ABCs and the spectrum map may be used to control the repositionable dynamic RISs.

In an additional embodiment, a system for controlling electromagnetic radiation in a geographical area is provided. System includes, a primary wireless system and a secondary wireless system positioned within a geographical area, the primary wireless system to generate a primary electromagnetic signal for a primary use region of the geographical area and the secondary wireless system to generate a secondary electromagnetic signal for a secondary use region of the geographical area. The system further includes a plurality of ambient backscatter communication (ABC) nodes positioned within the primary use region to create a radiation rejection zone within the primary use region, wherein the ABC nodes reduce the interference from the secondary electromagnetic signal in the radiation rejection zone.

In a particular embodiment, the system may further include, one or more repositionable dynamic reconfigurable intelligent surfaces (RISs) positioned within the geographical area, the one or more repositionable dynamic RISs to create a coverage extension zone for the secondary electromagnetic signal within the secondary use region.

Accordingly, the various embodiments of the present invention provide an improved system and method for controlling the electromagnetic radiation within a geographical area for coexisting smart radio environments.

BRIEF DESCRIPTION OF THE DRAWINGS

For a fuller understanding of the invention, reference should be made to the following detailed description, taken in connection with the accompanying drawings, in which:

FIG. 10A illustrates the reconstruction of spectrum based on 1-bit information of spectrum activity and conventional SVM using radical basis kernel, wherein the red region indicates active operation of primary system.

FIG. 10B illustrates successful construction of the spectrum map to identify a permission region (in blue) and active zone of the primary system and the area requiring high radio rejection based on the refinement of SVM.

DETAILED DESCRIPTION OF THE INVENTION

Figure 1:
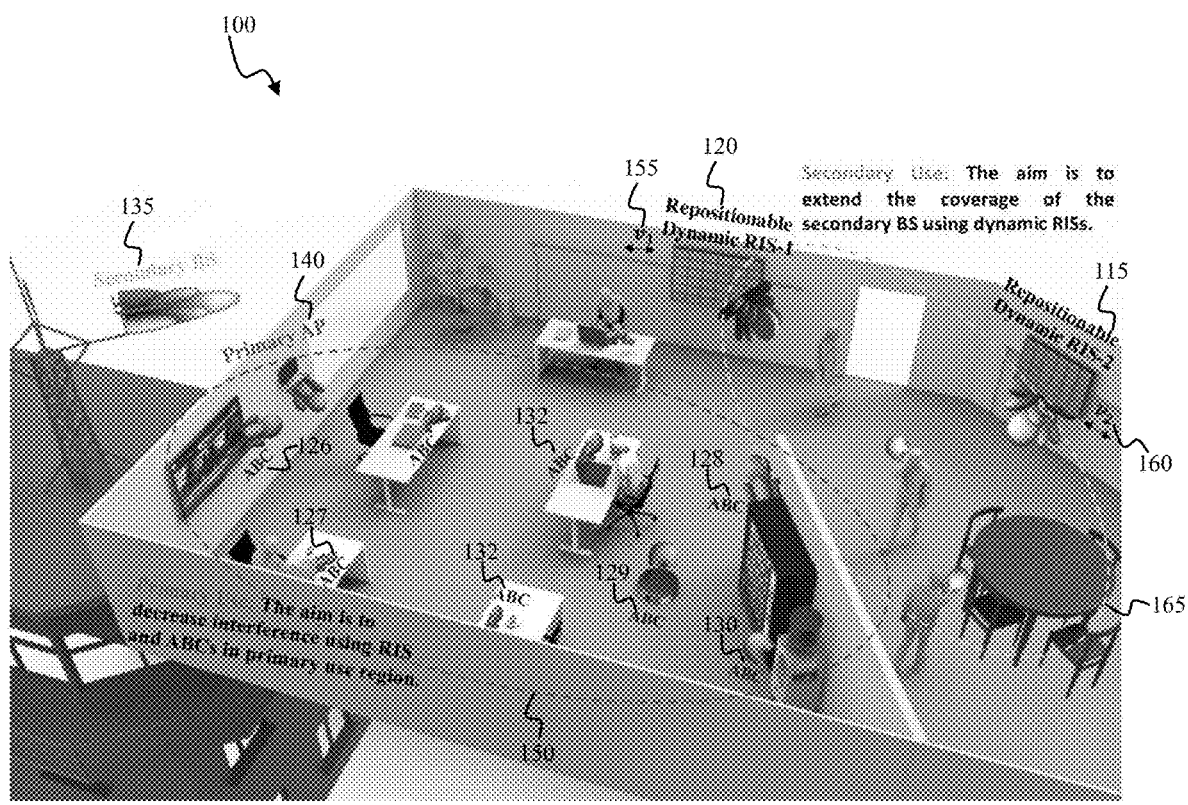
FIG. 1 illustrates a system structure for shaping the electromagnetic energy using repositionable dynamic RISs and ABC node, in accordance with an embodiment of the present invention.

Since the birth of cognitive radio and the extreme success of co-existing wireless systems (e.g., WiFi, Bluetooth, and other devices), wireless technology can dynamically utilize the spectrum and high-spectral waveforms by mitigating interference to primary passive users and primary active users. Cognitive radio networking (CRN) emerges as an effective way to design the coexisting wireless communication systems offering potential for enhanced spectrum efficiency, interference mitigation and interoperability. (CRN) only controls the parameters of end-to-end radios by sensing the environment and smartly adjusting relevant transmission and reception parameters. In addition to cognitive capabilities on the transmitter and receiver end, effective co-existing wireless communication systems require a disruptive system design and radio frequency (RF) implementation to maximize the spectrum utilization by maintaining extremely high radio rejection to avoid interference. For example, considering the many potential co-existing frequency bands, such as those for commercial radio communication reception, whose signal strength may be around −70 dBm to −120 dBm, advanced interference mitigation techniques over the whole area are needed to effectively capture the signal. Such a technological challenge, which requires controlling radio radiation within a geographical area, has not been well addressed in the literature. Also, how to maximally utilize the spatial spectrum and radiation control according to traffic dynamics in time and spatial domains remains the key challenge for future application scenarios that require high capacity (e.g., holography, virtual reality, non-terrestrial communication), high density (e.g., IoT environment in smart factories and smart offices) and high precision (e.g., robotic assembly and warehouse stocktaking).

Shaping the radiation energy and nulls over the region, together with time, frequency, code domains require a holistic approach toward smart and reconfigurable radio environments to provide more effective spatial spectrum utilization of co-existing wireless systems and networks. A fundamental question arises on how to evolve into a coexisting wireless system from a spectrum efficiency perspective by taking network infrastructure design into consideration. To answer that, the paradigm of smart radio environment has been introduced, which is empowered by the reconfigurable intelligent surface (RIS). Future wireless networks require a smart radio environment with RIS capabilities for sensing the environment and for applying customized transformations to the electromagnetic radio waves. Also, smart radio environments provide more degrees of freedom by electronically controlling the environment itself, rather than trying to control the transmitter and receiver end points and turns the wireless medium into a software-reconfigurable entity. Secure wireless transmission, interference reduction, and transmission range extension are some of the smart radio environment applications.

In various embodiments of the present invention the smart radio environment concept is enriched with the harmony of multiple repositionable dynamic RISs and coordinated ambient backscatter communication (ABC) nodes to extend the geographical coverage, by eliminating spectrum holes, and to maximize the sum rate throughput for a given geographical region and a given spectrum, while also enhancing geographical isolation and minimizing the interference of coexisting cognitive radio networks. In addition to providing controllable reflection properties with RISs and ABC nodes, the mobility of these devices in the environment is proposed to further enhance the system performance.

The proposed coexisting smart radio environment strategy 100, as illustrated FIG. 1, will achieve multiple goals, including interference management, coverage improvement, enhanced radio environment awareness (REA), effective spectrum mapping and intentional geographical radio isolation, that could potentially revolutionize the spatial spectrum efficiency of systems migrating from 5G's C-RAN and massive MIMO to 6G.

As shown in FIG. 1, in an exemplary embodiment, a primary access point (AP) 140 and a secondary base station (BS) 135 are considered in the proposed coexisting smart radio environment strategy 100. A first repositionable dynamic RIS 120 and a second repositionable RIS 115 are used to extend the coverage 165 of the secondary BS 135. As illustrated, in this exemplary embodiment, the first repositionable dynamic RIS 120 and the second repositionable RIS 115 may be moved along v1 or v2 axis, accordingly. Additionally, a plurality of ABCs 125-132 are also employed to decrease interference in the radiation rejection zone 150 of the primary AP 140. In various embodiments, the present invention creates extended, controlled radiation 165 of the secondary BS 135 in the 2D/3D geographical area 100, as shown in the FIG. 1, while creating a radiation-rejection zone 150 to ensure the successful operation of the primary AP 140. The system illustrated in FIG. 1 shapes the electromagnetic energy using the repositionable dynamic RISs 115, 120 and the ABC nodes 125-132, wherein the ABC nodes 125-132 are designed to be application specific devices and the RISs may operate across a wide frequency band regime for coarse tuning the radiation of the secondary system 135.

Figure 2:
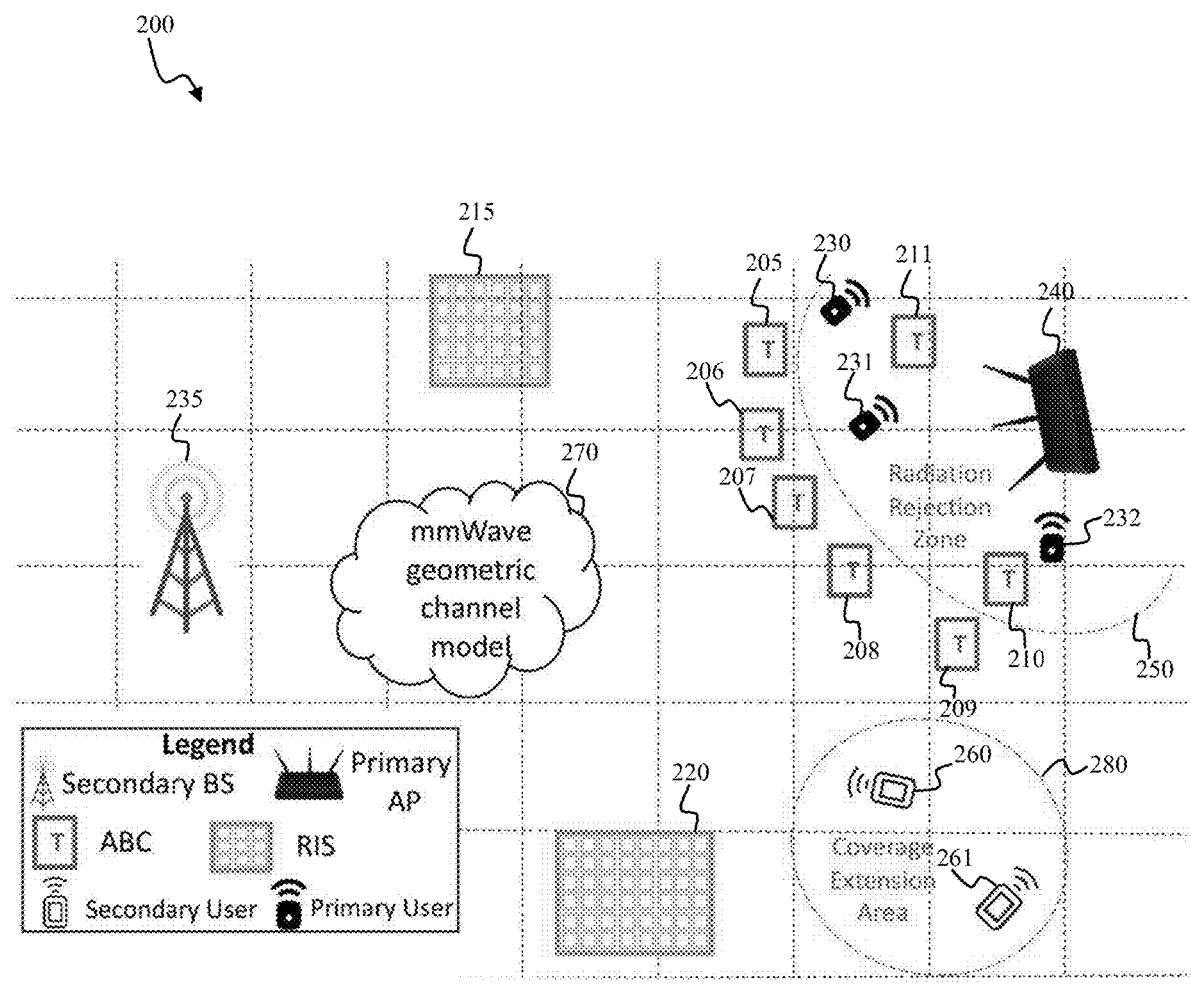
FIG. 2 illustrates a system structure including multiple RISs for coverage extension and multiple coordinated ABCs for radiation rejection, in accordance with an embodiment of the present invention.

The system architecture 200 of the proposed coexisting wireless communications can be visualized in FIG. 2. As extremely large antenna arrays approaching the limit of massive MIMO, the aim is to steer electromagnetic radiation while creating man-made radio rejection to protect primary passive or active uses. Such a system architecture has a large-scale primary access point (AP) 240 and a secondary base station (BS) 235, with smaller scale antenna arrays tagged to each user equipment or smart machine (e.g., robot or autonomous vehicle) to function as backscattering nodes (ABCs) 205-211 to create a radiation rejection zone 250 for the primary users 230-232. Moreover, multiple repositionable dynamic RISs 215, 220 are advanced by RF/antenna techniques to extend and tailor the geographical coverage extension area 280 (in reliability and outage) for the secondary users 260, 261, such that the interference to/from the coexisting radio systems 235, 240 can be minimized. Multiple coordinated ABC nodes 205-211 are used to finetune the radio coverage by forming a radiation rejection zone 250 to avoid interference to sensitive primary passive/active users 230-232. The mmWave geometric channel model 270 is utilized to demonstrate the feasibility of the system architecture 200, where signal-to-noise ratio (SNR) and capacity performance on the measurement points (MPs), which are distributed in the whole geometry, are numerically calculated. In the presented numerical studies presented below, it is shown that these mechanisms allow the creation of regional shapes where radiated power is distributed as desired.

The millimeter wave (mmWave) band usage is significantly investigated regarding next-generation wireless communications, which allows very small form-factor antenna arrays for both BS and the user equipments (UEs) and provides highly efficient directional transmissions to meet the high-capacity demand of future wireless technologies. However, energy losses in mmWave band channel are more susceptible to the propagation distance compared to the classical sub-3 GHz band.

The RIS technology is proposed as a channel control mechanism which converts the channel from a problem into a design element. It can achieve controlled and narrower beams at larger sizes relative to the wavelength to overcome the energy loss problem in mmWave channels. Unlike relays that decode-and-forward, RISs consume no energy, resulting in less noise effect. However, as shown in a comparison of RIS to decode-and-forward relaying, RISs need to have many elements to outperform relaying, since it has no power source. In both the RIS and multiple-antenna systems, one major challenge is the channel estimation and synchronization due to the large number of passive elements in a RIS. However, the sparseness of mmWave channels allows feasible and efficient synchronization and channel estimation algorithms. It is proposed to use a few active elements along the RIS for channel estimation, and following the estimation of the channel, these active elements then revert back to the reflecting mode. For instance, a two-stage algorithm is proposed for multi-user communication, where all elements are first turned off, and the channel between the secondary BS 235 and the secondary users 260, 261 is estimated. Second, the RIS elements are turned on one by one and the channel of the users is estimated for that RIS element. The full reflection of the RIS is always considered, i.e., all of its elements are switched ON with maximum reflection amplitude during both the channel estimation and data transmission phases. It is an inevitable fact that as the channel estimation and optimization schemes of the RIS develop the usage of the RIS in modern wireless systems will expand.

The RISs 215, 220 smartly controls the radio environment by scattering the signals to mitigate pathloss, fading, blockage, and multipath effects. RISs are typically configured to direct the primary system signal towards the destination by adapting its antenna elements to the propagation environment, while being regarded as nearly passive elements without any need for amplifiers or analog-to-digital/digital-to-analog converters (ADCs and DACs). The embodiments of the present invention expand upon the conventional use of RISs by utilizing the RISs to extend the coverage area of the secondary system 235 and to decrease the interference in the vicinity of primary system 240. To extend the coverage of secondary active users 260, 261, two RISs 215, 220 are illustrated to create the smart radio environment in FIG. 2. To create the radiation rejection zone 250, which can include passive or active primary users 230-232, multiple ABCs 205-211 are placed around the primary use area of the primary users 230-232.

Omnidirectional pathloss at the distance d is estimated using the do reference distance for the antenna far-field as follows:

$$PL(d)[dB] = PL(d_0) + 10\bar{n}\log_{10}\left(\frac{d}{d_0}\right) + SF \quad (1a)$$

$$PL(d_0)[dB] = 20\log_{10}\left(\frac{4\pi d_0 f_c}{c}\right) \quad (1b)$$

where c is the speed of light, $3\times10^8$ m/s, $f_c$ in Hz is the carrier frequency, $\bar{n}$ is the path-loss exponent, and SF is the shadow factor in dB. Also, outdoor-to-outdoor penetration loss is considered, assuming the environment has low loss buildings. Therefore, the following parabolic model is used for building penetration loss (BPL):

$$BPL[dB] = 10\log_{10}(5 + 0.03 \cdot f_c^2) \quad (2)$$

Throughout the analysis of the invention, the narrow-band mmWave channel model is used. It is assumed that all clusters and multi-path components arrive simultaneously and all their frequency components over the channel bandwidth B are received with the same level of attenuation. The corresponding channel matrix $H \in \mathbb{C}^{N_r \times N_t}$ at the time instant t is written as follows:

$$H = \sum_{n_{cl}}^{N_{cl}} \sum_{p=1}^{N_p(n_{cl})} \alpha_{n_{cl},p} \cdot \Omega_{n_{cl},p}^{R_x}(\psi_{n_{cl},p}^{R_x}, \theta_{n_{cl},p}^{R_x}) \cdot \Omega_{n_{cl},p}^{T_x}(\psi_{n_{ct},p}^{T_x}, \theta_{n_{ct},p}^{T_x})^H \quad (3a)$$

$$|\alpha_{n_{cl},p}|^2 = \epsilon_0 e^{\frac{-T_{n_{cl}}}{T_{n_{cl}}}} e^{\frac{-\tau_{n_{cl},p}}{\Gamma_p}} 10^{-0.1(PL[dB]+BPL[dB]+Z_{cl}+U_p)} \quad (3b)$$

where $N_{cl}$ and $N_p(n_{cl})$ denote the number of clusters and rays per each cluster, respectively. $Z_{cl} \sim N[0, \sigma_{cl}]$ and $U_p \sim N[0, \sigma_p]$ denote per-cluster and per-subpath shadowing in dB, respectively. $T_{n_{cl}}$, $\tau_{n_{cl},p}$, $\Gamma_{n_{cl}}$, and $\Gamma_p$ correspond to cluster arrival time, subpath arrival time, cluster decay constant, and sub-path decay constant, respectively. The parameters $\psi_{n_{cl},p}$ and $\theta_{n_{cl},p}$ are pth multi-path components of the north cluster's azimuth and elevation angles, respectively, and they characterize the angle-of-departure (AoD) and angle-of-arrival (AoA) at the transmitter and receiver. Moreover, $\Omega_{n_{cl},p}^{T_x}$ represents the $N_t \times 1$ array factor (AF) of the transmitter antenna array and $\Omega_{n_{cl},p}^{R_x}$ represents the $N_r \times 1$ array factor (AF) of the receiver antenna array. The notation $(\cdot)^H$ refers to the Hermitian transpose. The notations for the RIS presented here are also used to clarify the subsequent discussion, as well. Define a diagonal matrix $$\Theta_{RIS_k} = \text{diag}\left(\beta_1 e^{j\theta_1}, \ldots, \beta_{n_{RIS_k}} e^{j\theta_{n_{RIS_k}}}, \ldots, \beta_{N_{RIS_k}} e^{j\theta_{N_{RIS_k}}}\right) \text{ with } k = 1, \ldots, K,$$

where K is the total number of RISs deployed in the environment. The notation $N_{RIS_k}$ denotes the total reflecting elements in the kth RIS, $$\beta_{n_{RIS_k}}$$

is the amplitude reflection coefficient of the $N_{RIS}$th element of the kth RIS and j is the imaginary unit. Throughout the experimental embodiments, the reflection coefficient is assumed to be unit value $$(\beta_{n_{RIS_k}} = 1).$$

The $b_{RIS}$-bit discrete phase shift of RIS antennas can be chosen from the set $\mathcal{F}_{RIS}$ which is defined as follows:

$$\mathcal{F}_{RIS} = \left\{\theta_{n_{RIS_k}} = \frac{\varsigma n_{RIS}\pi}{2^{b_{RIS}}-1} \middle| \varsigma n_{RIS} \in \varsigma_{RIS} = \{0, 1, \ldots, 2^{b_{RIS}}-1\}\right\} \quad (4)$$

Uniform planar array (UPA) is utilized to represent RISs. Denote $I_r$ and $I_c$ the number of elements along with the row and column of the plane array, then the array response vector becomes:

$$\Omega_{UPA}(\psi, \theta) = [1, \ldots, e^{jx(i_r\cos(\omega)\cos(\theta)+i_c\sin(\theta))2\pi/\lambda}, \ldots] \quad (5)$$

where x is the inter-element spacing, $0 < i_r < I_r$ and $0 \leq i_c < I_c$ are the row and column indices of an antenna element, respectively. Analog beamforming is considered at the transmitter antenna array, where $N_{BS}$ is the total number of antennas. The transmitter antenna array is considered to be more complex compared to the RIS elements, therefore its phase shifter can generate more options with the control of bps bits. Then, the phase shift for the $n_{BS}$th transmit antenna can be chosen from the set $\mathcal{F}_{BS}$ where:

$$\mathcal{F}_{BS} = \left\{\theta_{n_{BS_k}} = \frac{\varsigma n_{BS}\pi}{2^{b_{BS}}-1} \middle| \varsigma n_{BS} \in \varsigma_{BSS} = \{0, 1, \ldots, 2^{b_{BS}}-1\}\right\} \quad (6)$$

After the selection of $n_{BS}$th antenna phase shift, the beamforming matrix W is formed with power constraint P. In the smart radio environment, spatial consistency is considered, which means that the large fading effects and scattering environment are correlated when multiple measurement points (MPs) are closed located in a local area (e.g., 10-15 m). A detailed explanation is provided below regarding how to integrate spatial consistency into the channel model. Additionally, throughout this analysis, perfect channel state information (CSI) is assumed for both RIS and ABC phase shift optimization.

In order to perform spatial-domain based simulations, multiple MPs are randomly selected, which can be considered to be many single antenna receivers. Since the coverage inside the specific area is desired to be increased, these measurement points are selected inside that area. The 2D demonstration of the simulation can be seen in FIG. 3A and FIG. 3B, where the area, whose capacity for the secondar is intended to increase, is circled.

The overall RIS-assisted MIMO system has three main propagation pathways which are between Tx and the RIS, the RIS and Rx and the direct way, which is assumed as non-line-of-sight (NLOS) channel. Regarding the channel matrices, $H_{BS-MP_m}$, $H_{BS-RIS_k}$, $H_{RIS-MP_m}$ corresponding to the channels between BS and mth MP, BS and kth RIS and mth MP, respectively. Analog beamformer matrix $W \in \mathbb{C}^{N_{BS} \times 1}$ is applied at the transmitter antenna array having $N_{BS}$ antennas with total power P. As an example, with two RISs, the channel matrices for the mth MP are $$H_{BS-MP_m} \in \mathbb{C}^{1 \times N_{BS}}, H_{BS-RIS_1} \in \mathbb{C}^{N_{RIS_1} \times N_{BS}}, H_{RIS_1-MP_m} \in \mathbb{C}^{1 \times N_{RIS_1}},$$
$$H_{BS-RIS_2} \in \mathbb{C}^{N_{RIS_2} \times N_{BS}}, H_{RIS_2-MP_m} \in \mathbb{C}^{1 \times N_{RIS_2}},$$

where $N_{RIS_1}$ and $N_{RIS_2}$ denote the number of elements for the first and second RISs. Moreover, phase matrices are $$\Theta_{RIS_1} \in \mathbb{C}^{N_{RIS_1} \times N_{RIS_1}} \text{ and } \Theta_{RIS_2} \in \mathbb{C}^{N_{RIS_2} \times N_{RIS_2}}$$

for the first and second RISs, respectively. The channel gain, $G_m$ for the mth MP with the presence of total K RISs can be represented as follows:

$$G_m = \left| H_{BS-MP_m} W + \sum_{k=1}^{K} H_{RIS_k-MP_m} \Theta_{RIS_k} H_{BS-RIS_k} W \right|^2 \quad (7)$$

Assuming transmit power equals to 0 dBm, capacity of the mth MP is evaluated by Shannon capacity formula:

$$R_m = B\log_2\left(1 + \frac{G_m}{\sigma^2}\right) \quad (8)$$

where B is the bandwidth and $\sigma^2$ is the variance of independent and identically distributed (i.i.d) circularly symmetric complex Gaussian noise and zero mean. Let $R=[R_1, R_2, \ldots R_M]$ and $\Theta_{RIS}=[\Theta_{RIS_1}, \ldots \Theta_{RIS_k}]$, the optimization problem can be formulated as follows:

$$\max_{\theta_{RIS} W} \mathbb{E}\{R\} \quad (9)$$
$$\text{s.t. } \|W\|^2 <= P$$
$$\theta_{n_{BS_k}} \in \mathcal{F}_{BS}, 1 \le n_{BS_k} \le N_{BS_k}$$
$$\theta_{n_{RIS_k}} \in \mathcal{F}_{RIS}, 1 \le n_{RIS_k} \le N_{RIS_k}$$

where $\mathbb{E}$ is the expectation operator of M total MPs. The optimization problem (P1) is non-convex. An alternating optimization technique is proposed to arrange the phase shifts of the BS and RIS at MPs and a solution to (P1). The procedure of this iterative technique is explained in Algorithm 1.

| Algorithm 1 Alternating Optimization for (P1) | |
|---|---|
| 1: | Initialize the all of elements of W, and $\theta_{n_{RIS_k}}$, $1 \le n_{RIS_k} \le N_{RIS_k}$, $\forall k = 1, \ldots, K$ with one. |
| 2: | repeat |
| 3: | for $n \le N_{BS} + \sum_{k=1}^{K} N_{RIS_k}$ do |
| 4: | Find the indices $\zeta_{BS} \in \zeta_{BS}$ and $\zeta_{RIS_k} \in \zeta_{RIS}$ that maximize the average capacity of total M MPs, which defined as $\mathbb{E}(R)$ |
| 5: | Assign the corresponding phase shift values depending on the index $\zeta_{BS}$ or $\zeta_{RIS_k}$ to the corresponding antenna phase shifter n |
| 6: | end for |
| 7: | until Convergence is reached |

Figure 3A:
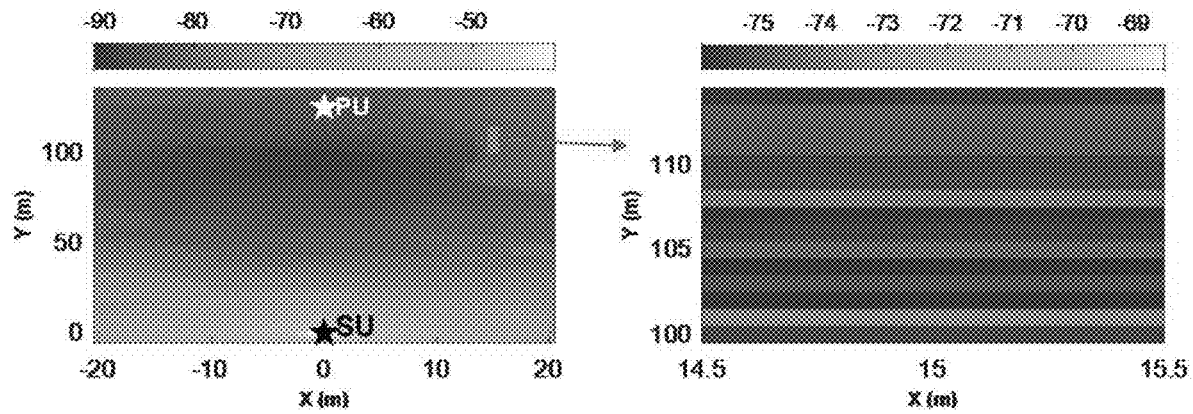
FIG. 3A illustrates a demonstration of coverage extension using only BS beamforming, where the color map is scaled in dB.
Figure 3B:
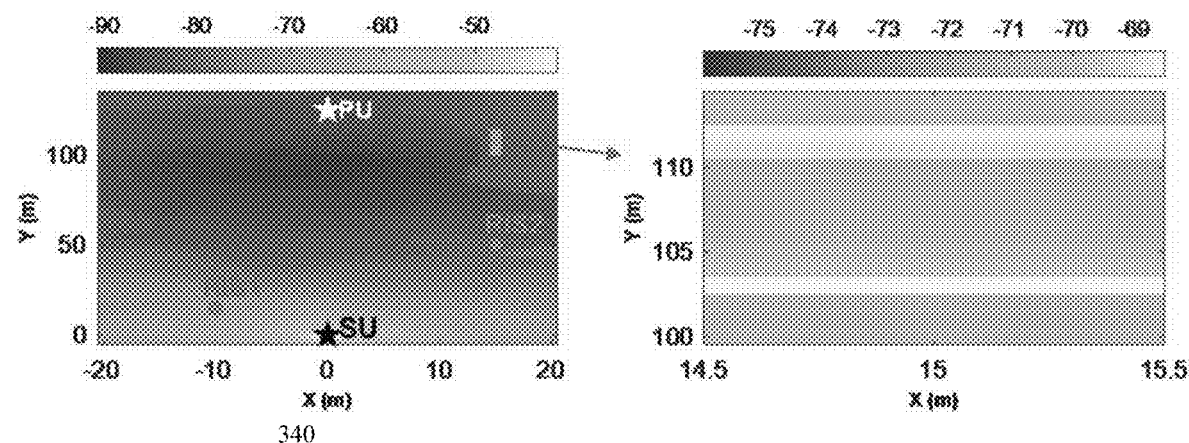
FIG. 3B illustrates a demonstration of coverage extension with two RISs, where the color map is scaled in dB.

The numerical results demonstrate the advantage of deploying multiple statis RISs to expand the coverage of the secondary active users. The 2D topological color map in FIG. 3A and FIG. 3B (show in greyscale) illustrates the performance of RISs compared to BS beamforming in order to maximize the signal power in the encircles area of 15 MPs, in terms of dB. In FIG. 3A, the secondary user (SU) is located at (0,0), whereas the primary user (PU) is located at (0,120). In FIG. 3B the the secondary user (SU) is located at (0,0), whereas the primary user (PU) is located at (0,120). Information about other simulation parameters can be found in Table 1.

TABLE 1

| Parameter | Value |
|---|---|
| Carrier Frequency | 28 GHz |
| Antenna gain of BS | 30 dB |
| Transmitter gain of BS | 10 dB |
| Antenna gain of ABC | 15 dB |
| Operating Scenario | Urban Microcell |
| BS Antenna Number | 16 |
| RISs Element Numbers | 128, 256 |
| ABCs Antenna Number | 4x4 (both Rx, Tx) |
| Number of total ABCs | 16 |

In FIG. 3A, only BS beamforming is utilized to extend the coverage of the encircled area. An enlarged plot of the encircled area is also illustrated. In FIG. 3B, two RISs are distributed in the map and used to extend the coverage of the encircled area. An enlarged plot of the encircled area is also illustrated. MPs use the single-element antenna where phase shifts of RIs are arranged to maximize the average capacity of all MPs as formulated in (P1).

Throughout the mathematical simulations of the experimental embodiments, it is assumed that RISs have two different phase options controlled by one-bit, whereas the phase options for the BS antennas are chosen from the six-bit discrete phase-shifter. They all are optimized in an iterative manner until convergence is achieved by Algorithm 1. In this urban-microcell simulation, the BS antenna number is taken as N=16 and the number of elements for the first RIS and the second RIS are 128 and 256, respectively. The signal power in the encircled area by BS beamforming can be seen in FIG. 3A, whereas the effect of RISs can be seen in FIG. 3B. As shown in the enlarged plots 315, 335, simple usage of two RISs already achieves approximately 6 dB gain regarding the signal power of the secondary user 320, even if there is a one-bit control on RIS. It is known that the number of bits in the RIS design and the location of the RIS remarkably affect the performance in the coverage area, as discussed in more detail below.

Location, beam alignment and phase of the RIS can be optimized to enhance the system performance. Although the current RIS technology primarily deploys fixed elements built in the terrestrial scenarios, the interest in the integration of RIS into mobile systems is increasing. However, in the known studies with UAVs, locations of the RISs are assumed to be fixed and only the movement of the UAVs is considered. Therefore, the control over the channel clusters is limited.

It is known that glitches occur in the power of "pencil-beam" signal, whenever even humans walk across it, resulting in a huge SNR drop of 20 dB. This scenario can be encountered in shopping malls, office environments and especially IoT factories where tactile Internet plays a very important role. It is known that positioning of RIS plays an important role to improve the system performance. However, dynamic positioning of RIS regarding the mobility in the indoor environment has not yet been studied. Arranging the RIS position dynamically, will provide much more control on the exploitation of channel clusters as well as shadowing effects that may cause high power fluctuations in a short time frame. It is believed that the repositionable dynamic RIS will shed a light on how to solve these problems and introduce an additional degree of freedom.

By utilizing repositionable dynamic RISs, the channel control will be more efficient by placing the RIS elements at the optimal location. In addition to the phases of the RIS elements, the location of the surface needs to be optimized. For mobile and nomadic users, the optimal location changes over time, requiring repositionable dynamic RIS deployment. As the scenario in FIG. 1 depicts, more than one repositionable dynamic RIS with a simple rail-based moving system may be implemented to examine the superiority of repositionable dynamic RISs, in terms of spectrum utilization and interference management. As shown in FIG. 1, the first repositionable dynamic RIS 120 includes a first rail-based moving system 155 and the second repositionable dynamic RIS 115 includes a second rail-based moving system 160.

The position of an RIS may initially be changed along the linear line in the range of approximately five meters with a slow speed (in the scale of seconds). Since its position will change along the one dimension and the geometry of the RIS elements will remain fixed, tracking and channel estimation processes (or equivalent synchronization) will be practical to implement and deploy compared to 3D movement in spatially adaptive antenna arrays.

Figure 4:
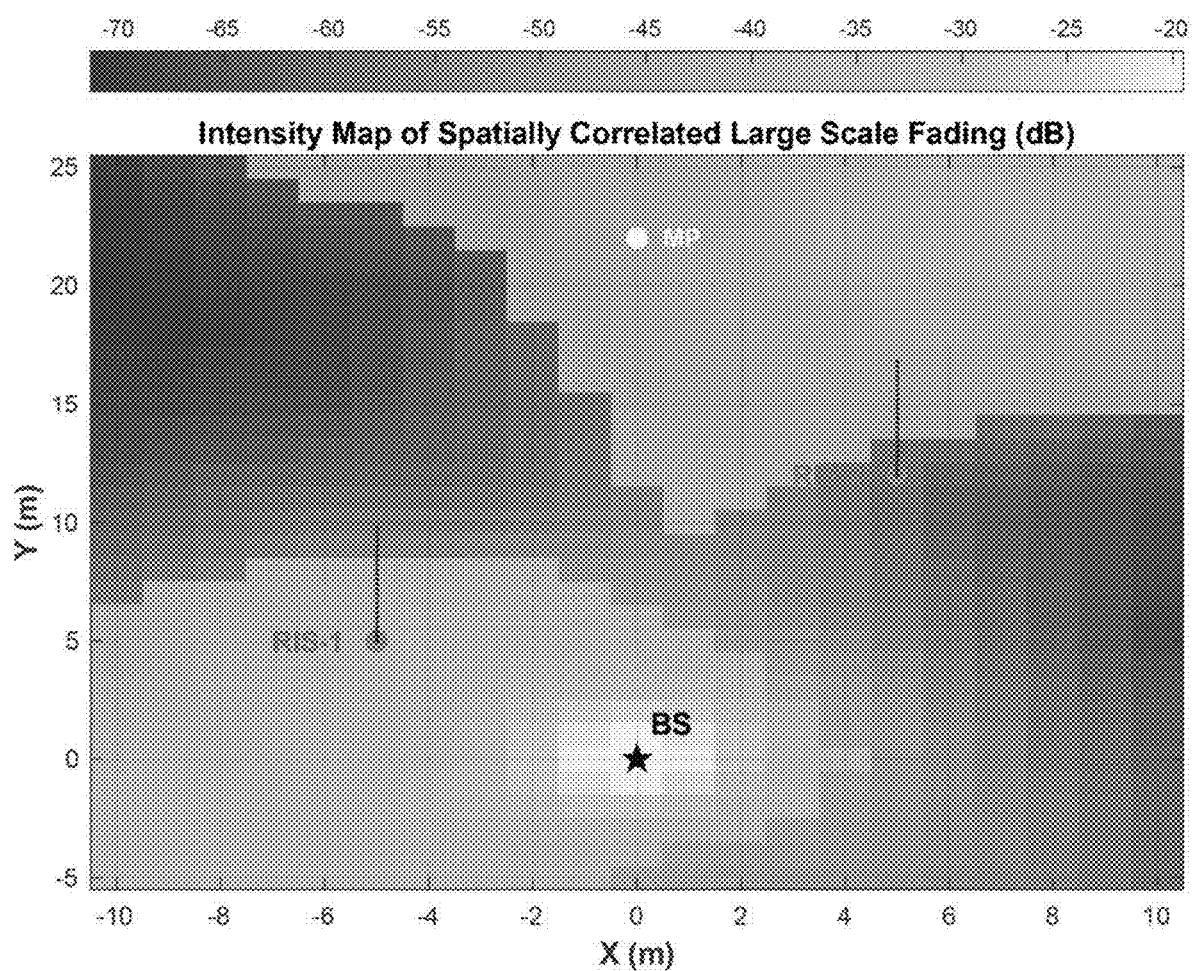
FIG. 4 illustrates a demonstration of the power distribution regarding shadowing and path-loss effects where initial RISs locations and their trajectories are shown as magenta circles and black dashed lines, respectively.

To realize the spatial consistency while re-positioning the RIS, spatially correlated large-scale parameters, such as SF (shadow fading) and line-of-sight (LOS)/non-LOS (NLOS) conditions are generated. The correlation distance in indoor simulation is determined as 5 meters. In addition to point-to-point channel H generated in equations (3a) and (3b), a 2D exponential filter is applied to the simulated area as follows:

$$f(p,q) = \exp\left(-\frac{\sqrt{p^2+q^2}}{d_{co}}\right) \quad (10)$$

where p and q are filter coordinates with respect to the center of the filter and $d_{co}$ is the correlation distance of shadowing. Applying the filter to the channel H, the correlated values in the map are calculated as follows:

$$H_c(i,j) = \Sigma_p \Sigma_q f(p,q) H(i-p+1, j-q+1) \quad (11)$$

where $H_c(i,j)$ is the correlated channel i and j are the coordinates of grid points in the map M with $(i,j)_k \in \mathbb{R}^2$ for kth RIS. Throughout the study, the movement of the RIS is constrained in only the y axis with at most 5 m distance, as is shown in FIG. 4. FIG. 4 illustrates the power distribution regarding shadowing and path-loss effects, wherein the BS location is shown and the initial RIS locations are shown as magenta and their relative trajectories illustrated as black dashed lines.

The purpose of deploying repositionable dynamic RISs in an environment is to have more control over the channel power variations in a short time frame by introducing a new degree of freedom where the speed and location of the RIS can be controlled. The goal is to increase the coverage of secondary users in a dedicated area with the help of repositionable dynamic RISs.

With the concept of repositionable dynamic RIS, the channel gain evaluated in equation (7) depends upon the position of the kth RIS. The location of the kth RIS is expressed as 2D pairs $(i,j)_k$, $\forall k=1, \ldots, K$. The channel matrix H(i,j) at that position is obtained via equation (11). Then, the channel gain $G'_m$ for the mth MP can be written as follows:

$$G'_m = \left| H_{BS-MP_m} W + \sum_{k=1}^{K} H(i,j)_{RIS_k-MP_m} \Theta_{RIS_k} H(i,j)_{BS-RIS_k} W \right|^2 \quad (12)$$

One realization of a spatially correlated map with two RISs placed in the environment can be seen in FIG. 4. Similar to equation (8), the capacity of the mth MP 450 with different RISs locations is evaluated as follows:

$$R'_m = B\log_2\left(1 + \frac{G'_m}{\sigma^2}\right) \quad (13)$$

The position $(i,j)_k$ of the kth RIS needs to be considered in the optimization problem (P1) when the repositionable dynamic RIS is studied. By defining the position matrix with $Z=[(i,j)_1^T], \ldots (i,j)_K^T$, and $R=[R_1', R_2', \ldots R_M']$ the problem formulation (P1) can be modified as follows:

(14)

$$\max_{\Theta_{RIS} W, Z} \mathbb{E}\{R'\} \quad (P2)$$

$$\text{s.t. } \|W\|^2 <= P$$

$$\theta_{n_{BS_k}} \in \mathcal{F}_{BS}, \ 1 \le n_{BS_k} \le N_{BS_k}$$

$$\theta_{n_{RIS_k}} \in \mathcal{F}_{RIS}, \ 1 \le n_{RIS_k} \le N_{RIS_k}$$

$$(i,j)_k \in M$$

Similar to Algorithm 1, exhaustive searching of both the position of RISs and their phase of elements is considered to solve non-convex optimization problem (P2) of equation (14). The detailed algorithm scheme is presented in Algorithm 2.

---

Algorithm 2 Alternating Optimization for (P2)

1:     Initialize the all elements of W, and $\beta_{n_{RIS_k}}$, $1 \le n_{RIS_k} \le N_{RIS_k}$, $\forall k = 1, \ldots, K$ with one. Also, choose arbitrary RISs locations to determine $(i,j)_{RIS_k}$.
2:     repeat
3:        for all grid points $(i,j)_{RIS_k} \in M$, $\forall k = 1, \ldots, K$ do
4:           for $n \le N_{BS} + N_{RIS_1} + N_{RIS_2}$ do
5:              Find the indices $\zeta_{BS} \in \zeta_{BS}$, $\zeta_{RIS_k} \in \zeta_{RIS}$.
              and $(i',j')_{RIS_k} \in M$ that maximize the average
              capacity of total M MPs, which defined as $\mathbb{E}\{R'\}$

| Algorithm 2 Alternating Optimization for (P2) | |
|---|---|
| 6: | Assign the corresponding phase shift values depending on the index $\zeta_{BS}$ or $\zeta_{RIS_k}$ to the corresponding antenna phase shifter n |
| 7: | end for |
| 8: | Fix the position of kth repositionable dynamic RIS to the point of (i', j')$_{RIS_k}$ |
| 9: | end for |
| 10: | until Convergence is reached |

Figure 5:
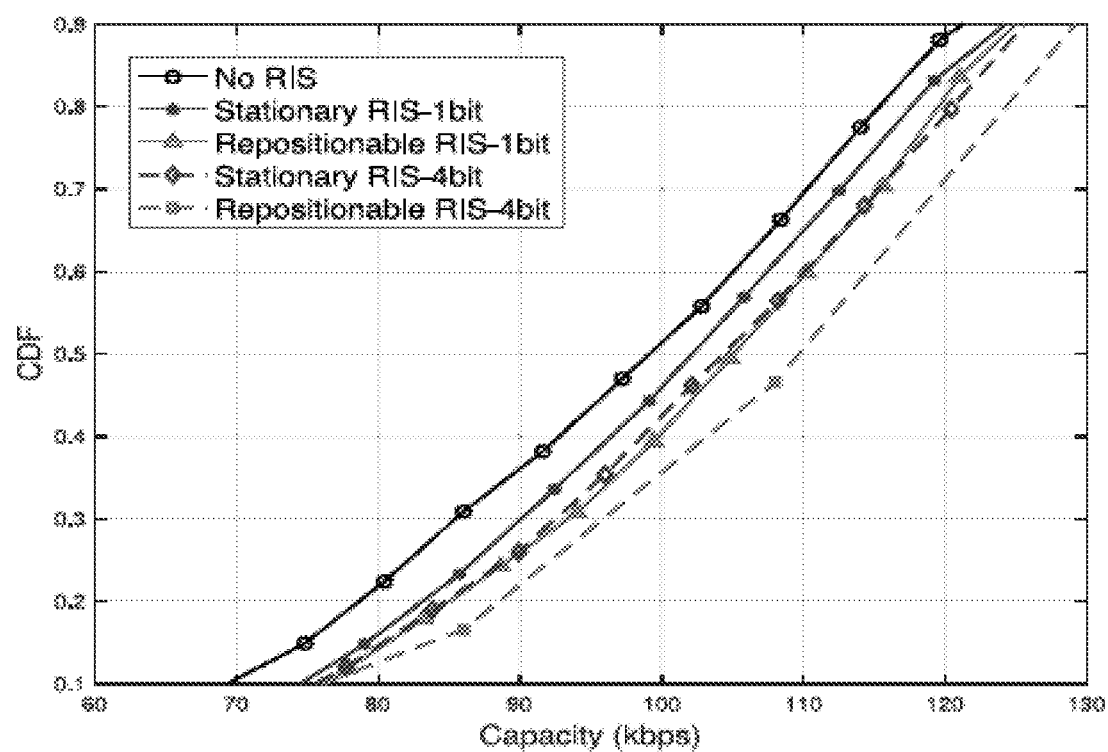
FIG. 5 is a graphical illustration of the numerical evaluation of capacity of the proposed system showing the advantage of repositionable dynamic RISs.

FIG. 5 provides graphical illustration of the numerical evaluation of capacity of the proposed system showing the advantage of repositionable dynamic RISs. The advantage of repositionable RIS in terms of capacity can be seen in FIG. 5, considering both 1-bit and 4-bits RIS. It is observed that approximately 15% improvement in the capacity of the secondary system is achieved with the use of repositionable dynamic RIS. Also, the increase in the phase-shifter capability helps to enhance the system performance. Throughout the study, it is assumed that the speed of the RISs is low enough to neglect the Doppler shifts. However, the time domain representation including time-frequency Doppler shift profile of the received signal and its effect on performance should be studied and more general mobility patterns, including ways of linear and nonlinear motion, should be explored in the future.

Although the dynamic deployment of RISs can extend the radio coverage of the co-existing system(s), to avoid the interference to the primary system (particularly the receivers of the primary system having high radio sensitivity or operating in low signal strength), there is a need for further improved technology beyond effective guided radio coverage by RISs. In order to prevent signal interference at the primary users, and in particular the receivers of the primary users having high radio sensitivity or those operating at low signal strength, there is a need for further improved technology beyond current technologies, such as the reconfigurable dynamic intelligent surfaces (RIS) and multiple-input-multiple-output (MIMO) antennas. The present invention creates a radiation rejection zone 150, as shown in FIG. 1, which protects the primary user against signal transmissions from the secondary user. The radiation rejection zone 150 meets the following requirements: (i) further degrading the signal strength from the secondary user into the radiation rejection zone 150; (ii) minimum interference to the reception of primary user; (iii) the radiation rejection is provided by devices having low energy consumption or battery-less.

In accordance with the embodiments of the present invention the formation of the radiation rejection zone 150, considering coherent modulations in state-of-the-art systems, is effective in disruptively backscattering the signals from the secondary system 135 by deploying the ABC nodes 125-132 just outside the area of the radiation rejection zone 150. The rationale behind the inventive concept is to use each backscatter node 125-132 to create a new transmission path, with appropriate phase change in the nearby area (due to low power), to create man-made deep fades of secondary co-existing transmission for nearby receivers of primary users. This disruptive approach of applying backscattering is simple but surprisingly satisfies the desirable conditions.

ABC was previously introduced with little, or even no, battery power. With the advance of wireless power charging technology, ABCs has received great attention in IoT and sensor networks. Its reservation-based multi-access has been previously studied. Further explorations based on cooperative communications and cognitive communications suggest wide range of application scenarios. For low-complexity, non-coherent backscatter communication has also been previously examined in. All rely on successful RF/antenna implementation.

With reference to FIG. 2, the concept of creating man-made deep fades to reject radiation from one or more secondary systems 235, of course, cannot be realized simply by 180° phase inversion at each backscattering node 205-210, which must be organized into a small antenna array to create meaningful man-made fades. A combination of two beamforming integrated circuit (BFIC) can be used for ABC implementation having two antenna arrays for transmit (Tx) and receive (Rx) functionality. The array may include both variable 5-bit phase shifter and variable amplifier with the range of 31 dB. Two micro-controller units arrange both the phase, amplitude and functionality of the ABC antenna array. By taking advantage of the similarities in RIS and ABC technologies, these ambient backscatter communication nodes 205-210 together can form the ambient backscatter communication (ABC), by reusing known mathematical principles regarding the mmWave channel and 2D topographic map generation. Instead of using the RISs, multiple coordinated ABCs are positioned to form the desirable radiation rejection zone 250 around the sensitive primary receiver 240, as shown in FIG. 2. Particularly, the radiation rejection zone 250 shown inside the dashed line in FIG. 1 protects the passive users 230-232 from electromagnetic radiation emitted by the secondary system 235.

Similar to the previously described phase-shifter matrix of the RIS, the analog beamforming matrix of lth ABC nodes is defined as $$\Theta_{ABC_l} = \text{diag}\left(\beta_1 e^{j\theta_1}, \ldots, \beta_{n_{ABC_l}} e^{j\theta_{n_{ABC_l}}}, \ldots, \beta_N e^{j\theta_{n_{ABC_l}}}\right),$$

where l=1, ... L and L is the total number of ABC nodes operating in the system and where each ABC node has $N_{ABC}$ antennas. To explore the advantage of deploying multiple ABC nodes 205-210 to protect the radiation rejection zone from transmission from the secondary system 235, ABC nodes 205-210 are first assumed to be located adjacent to the radiation rejection zone 250. In addition to the common channel model previously described, for the mth MP, the matrices $$H_{BS-ABC_l} \in \mathbb{C}^{N_{ABC_l} \times N_{BS}}, \text{ and } H_{ABC_l-MP_m} \in \mathbb{C}^{1 \times N_{ABC_l}},$$

are generated, where $N_{ABC_l}$ denotes the antenna number of the lth ABC. The phase matrix of lth ABC is $$\Theta_{ABC_l} \in \mathbb{C}^{N_{ABC_l} \times N_{ABC_l}}.$$

Similar to the transmitter antenna array, the phase-shifter of ABC generates $2^{b_{ABC}}$ options with the control of $b_{ABC}$ bits. Then, the phase selection for the $n_{ABC}$th transmit antenna chosen from the set $\mathcal{F}_A$ where:

$$\mathcal{F}_A = \left\{\theta_{n_{ABC_k}} = \frac{s_{n_{ABC}}\pi}{2^{b_{ABC}}} \middle| s_{n_{ABC}} \in s_{ABC} = \{0, \ldots, 2^{b_{ABC}} - 1\}\right\} \quad (15)$$

The channel gain from the secondary user transmission for the mth MP, $G''_m$, can be written as follows:

$$G''_m = \left| H_{BS-MP_m} W + \sum_{l=1}^{L} H_{ABC_l-MP_m} \Theta_{ABC_l} H_{BS-ABC_l} W \right|^2 \quad (16)$$

where the total L number of ABCs are located in the vicinity of the primary user. The interference power in the mth MP around the primary user region due to secondary user transmission is equal to $G''_m$.

Here, the aim is to use multiple ABCs to reject the radiation due to the secondary transmission. The electromagnetic energy is shaped via backscattering phenomena to protect the primary user zone from unwanted and detrimental radiation. It is shown in numerical results that by coordinating each ABC node, the radiation rejection zone that is protected from secondary user radiation can be created.

Letting $G''=[G''_1, \ldots, G''_M]$ and $\Theta_{ABC}=[\Theta_{ABC_1}, \ldots, \Theta_{ABC_L}]$, the optimization problem aiming to create the radiation rejection zone can be formulated as a minimization problem:

(17)

$$\max_{\Theta_{ABC}, W} \mathbb{E}\{G''\} \quad (P3)$$

s.t. $\|W\|^2 <= P$ $\theta_{n_{BS_k}} \in \mathcal{F}_{BS}, \ 1 \leq n_{BS_k} \leq N_{BS_k}$ $\theta_{n_{RIS_k}} \in \mathcal{F}_{RIS}, \ 1 \leq n_{RIS_k} \leq N_{RIS_k}$ $(i, j)_k \in M$ $\|\Theta_{ABC_l}\|^2 <= P_l, \ 1 \leq l \leq L,$ $\theta_{n_{ABC_k}} \in \mathcal{F}_A, \ 1 \leq n_{ABC_k} \leq N_{ABC_k}$ where, P is the power constraint of the lth ABC. Similar to Algorithm 1 and Algorithm 2, an alternating optimization technique is again utilized to arrange the phase shifts at the BS, and ABCs of 5-bit discrete phase-shifters. The aim of the optimization algorithm for the problem (P3) is instead to minimize the average interference power in the area of the secondary user, $\mathbb{E}\{G''\}$.

Figure 6A:
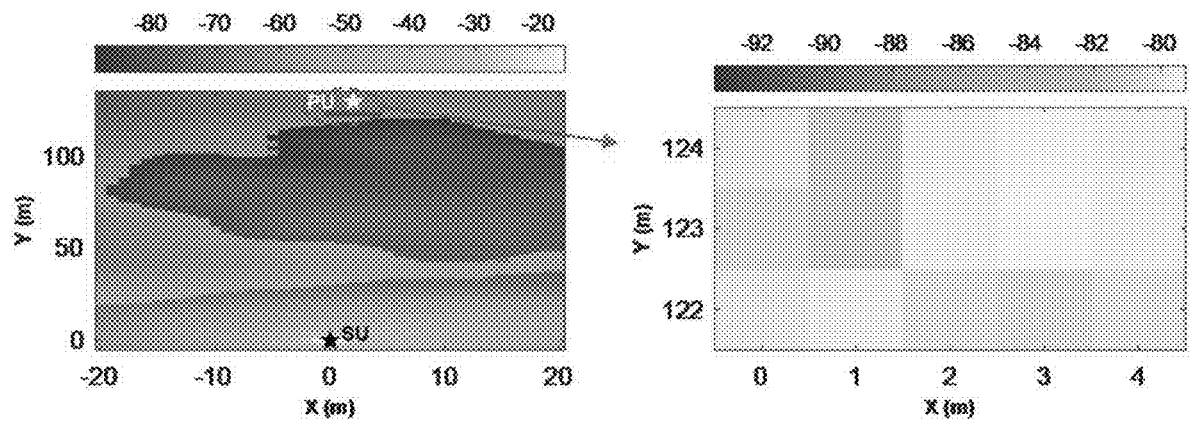
FIG. 6A illustrates a demonstration of zone protection with conventional BS beamforming, where the color map is scaled in dB.
Figure 6B:
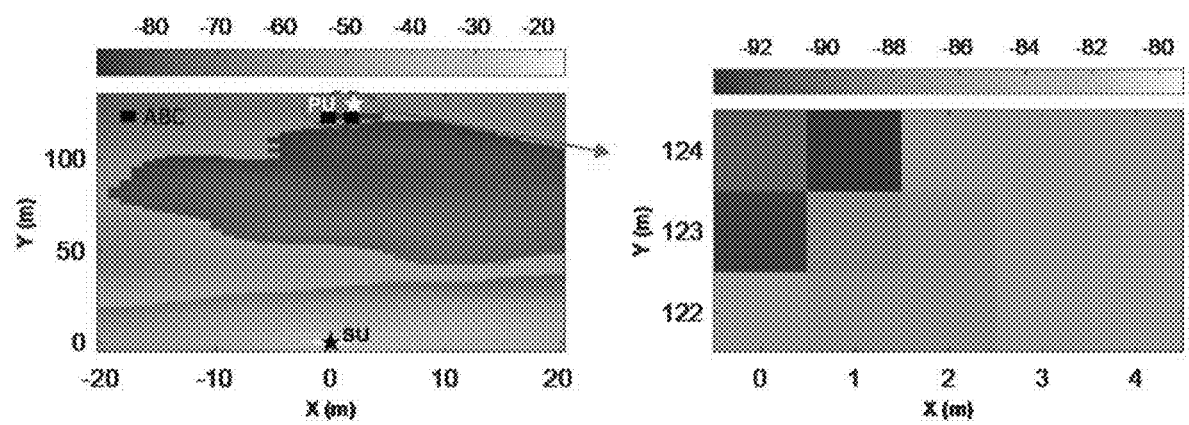
FIG. 6B illustrates a demonstration of zone protection with the proposed system architecture comprising multiple ABCs, where the color map is scaled in dB.

The 2D topological map in FIG. 6A and FIG. 6B shows the performance of multiple coordinated ABCs minimizing the signal power in the encircled area in terms of dB. The secondary user (SU) is denoted as a black star and the primary user (PU) is a white star. Multiple coordinated ABCs are also illustrated and positioned to be distributed around the radiation rejection zone. The detected radiation power in the red encircled area by BS beamforming is shown in FIG. 6A, whereas the effect of multiple ABCs to suppress the interference is clearly observed (in colder color) in FIG. 6B. In the enlarged plots, initial usage of ABC achieves 12 dB reduction of the interference power in the rejection zone by protecting the primary system or its sensitive receiver. Although ABC nodes are just intuitively placed in the exemplary embodiment, impressive degradation to form the radiation rejection zone is proven a disruptive, but effective, approach. Based on the rich literature about ABC, further explorations and exploitation may be conducted.

In the various embodiments of the present invention, multiple ABCs and repositionable dynamic RISs are utilized in a coordinated manner to control the electromagnetic radiation in a 3D cognitive radio system. In a specific embodiment, multiple ABCs and repositionable RISs are integrated into one system in order to control the entire electromagnetic radiation that is emitted from the secondary BS. The goal of the system is to minimize the radiation power in the vicinity of the primary users, and at the same time, the entire radiation from the secondary BS is steered to an area where the power of the secondary users needs to be maximized. To combine both the dynamic repositionable RISs and multiple ABCs into one system to control the whole electromagnetic radiation in the environment, the problem formulation (P2) and (P3) can be revisited as follows:

(18)

$$\max_{\Theta_{RIS} \Theta_{ABC}, W, Z} \mathbb{E}\{R''\} \quad (P4)$$

s.t. $\|G''\|^2 <= I$ $\|W\|^2 <= P$ $\theta_{n_{BS_k}} \in \mathcal{F}_{BS}, \ 1 \leq n_{BS_k} \leq N_{BS_k}$ $\theta_{n_{RIS_k}} \in \mathcal{F}_{RIS}, \ 1 \leq n_{RIS_k} \leq N_{RIS_k}$ $(i, j)_k \in M$ $\|\Theta_{ABC_l}\|^2 <= P_l, \ 1 \leq l \leq L,$ $\theta_{n_{ABC_k}} \in \mathcal{F}_A, \ 1 \leq n_{ABC_k} \leq N_{ABC_k}$ where l is the predefined interference power constraint in the vicinity of the primary user. Problem (P4) has both non-convex objective function and constraints under the sets $\mathcal{F}_{BS}, \mathcal{F}_{RIS}, \mathcal{F}_A$. The Monte Carlo method is used to eliminate the mathematical expectation in the objection function of (P4). Then, an alternating optimization method, similar to Algorithm 2 and Algorithm 3 is employed to find sub-optimum solutions for $\Theta_{RIS} \Theta_{ABC}$, W, Z.

| Algorithm 3 Alternating Optimization for (P3) |
| --- |
| 1: Initialize the all elements of W and $\Theta_{ABC_l}, \forall l = 1, \ldots, L$ with one. |
| 2: repeat |
| 3: for $n \leq N_{BS} + \sum_{i}^{L} N_{ABC}$ (total elements) do |
| 4: Assign the corresponding phase shift value depending on the index j to the antenna i |
| 5: Find the indices $\zeta_{BS} \in \varsigma_{BS}$ and $\zeta_{ABC_l} \in \varsigma_{ABC}$ that minimize the average channel gain of total M MPs, denoted as $G^n$ |
| 6: Assign the corresponding phase shift values depending on the index $\zeta_{BS}$ or $\zeta_{ABC_l}$ to the corresponding antenna phase shifter n |
| end for |
| 8: until Convergence is reached |

Figure 7:
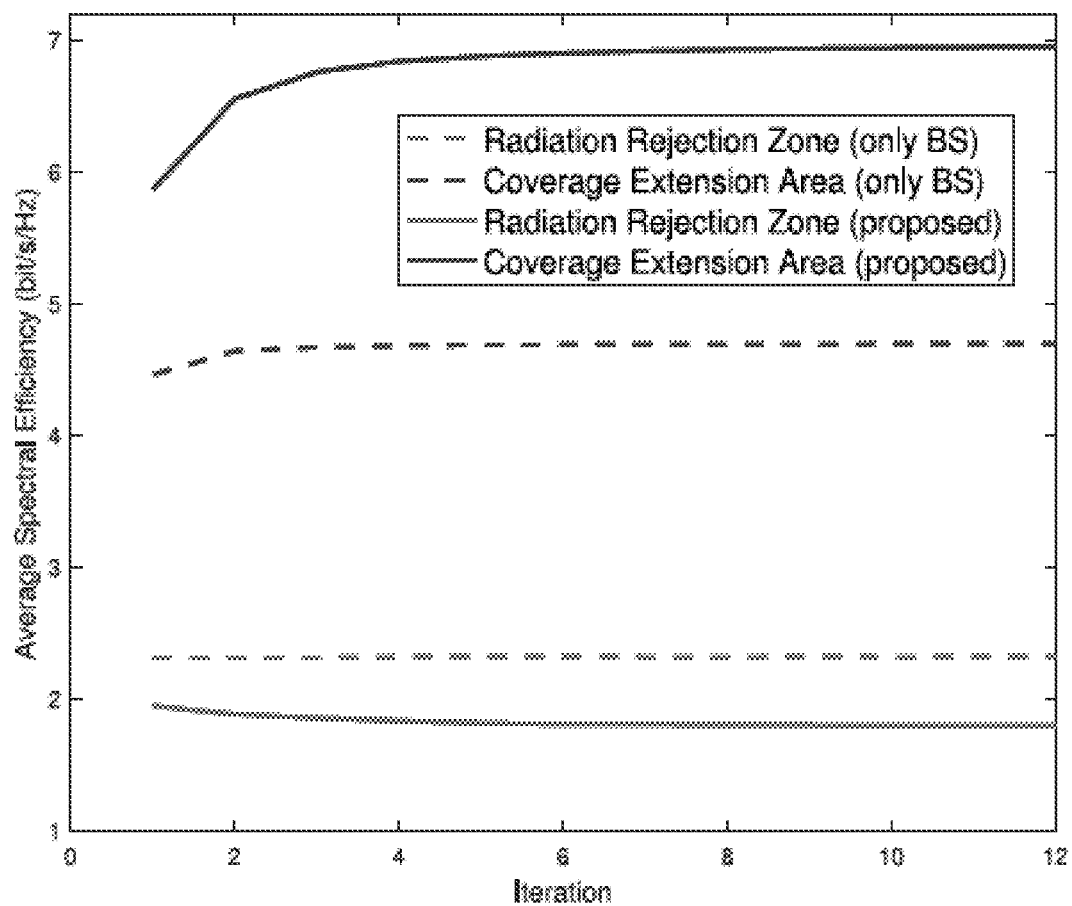
FIG. 7 is a graphical illustration of the convergence performance of the present invention and its comparison with the case where RISs and ABSs are absent.

It can readily be verified that the objective value of (P1) and (P2) monotonically increases with alternating optimization algorithm in each iteration where coverage has desired to be increased. In addition, due to the power constraints, the objective function has an upper bound. It is guaranteed to converge. Additionally, the proposed algorithm can guarantee to yield a monotonically decreasing objective function compared to the previous phase solution, i.e., $G''(\Theta_{ABC})^{t+1} \leq G'' (\Theta_{ABC})^t$ for interference minimization in (P3), where t denotes the iteration number. The convergence performance of the proposed alternating optimization algorithm is presented in FIG. 7. Here, vertical axis demonstrates the average spectral efficiency over all MPs in the coverage extension area and radiation rejection zone due to secondary BS emission. It can be seen from FIG. 7 that the proposed algorithm converges for about 6 iterations. It can also be implied that the proposed structure enhances the spectral efficiency of the coverage extension area of the secondary users. At the same time, it can be implied that the proposed structure decreases the electromagnetic radiation of the secondary BS within the vicinity of the primary users.

Figure 8A:
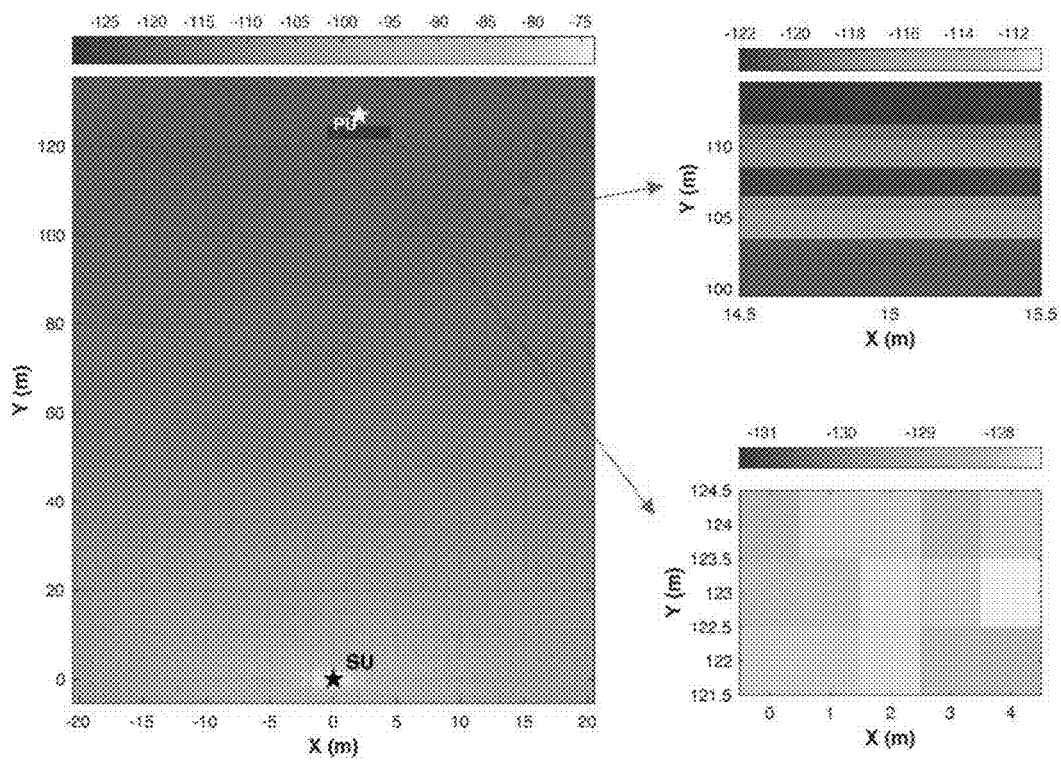
FIG. 8A illustrates a demonstration of radiation control with only BS beamforming, wherein the color map is scaled in dB.
Figure 8B:
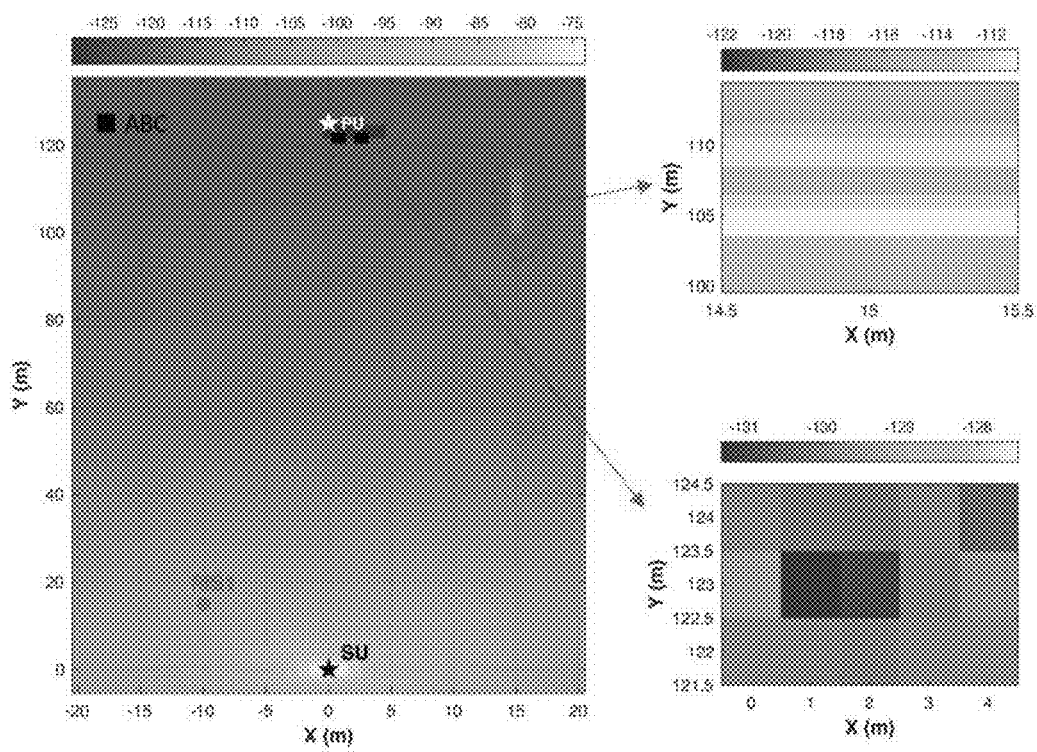
FIG. 8B illustrates a demonstration of radiation control with repositionable dynamic RIS and multiple ABCs for the proposed system architecture, in accordance with the present invention, wherein the color map is scaled in dB.

The coexistence of the repositionable dynamic RISs and the multiple ABS are studied in FIG. 8. The simulation parameters for the BS, RIS and ABC are given as in Table 1. The dB scale color map shown in FIG. 8A is obtained by optimizing the antennas of the secondary BS. On the other hand, the position of the repositionable dynamic RISs and phase shifts of the ABCs and RISs antennas are optimized in FIG. 8B. It can be seen that the signal power of the secondary BS is enhanced around 10 dB in the coverage extension area. At the same time, the interference power in the vicinity of the primary users can be rejected around 3 dB. The computational complexing of the proposed algorithms includes the multiplication of all possible selections for $\Theta_{RIS}\Theta_{ABC}$, W, Z, depending on $b_{RIS}$, $b_{ABC}$, $b_{BS}$ and the coordinates of grid points in the map M, which is relatively high and needs to be decreased to make the proposed structure suitable for real test-bed.

One critical criterion to form a smart radio environment is to classify the permissible area(s) allowing co-existing radio communication. It is proposed to elaborate the machine learning technique to better accomplish this goal, as discussed in detail below.

One of the fundamental challenges of the next wireless communications systems lies in the spectrum utilization with the increase in massive connectivity and various quality of service (QOS) requirements. The spectrum availability or utilization indicated on a geographical map, known as a spectrum map, was initially realized by synthetic aperture radar or compressive sensing. It's application to cellular systems starts from cognitive radio resource allocation based on distributed sensing in 3GPP R10. Cognitive radio network tomography further utilizes statistical inference to enable holistic understanding of spectrum activities. By integrating both cognitive radio network tomography and the spectrum map, the spectrum map can empower resource management for QoS guarantees and opportunistic routing. The amazing aspect of spectrum map is explained by FIG. 1 to allow secondary systems geographically separated from primary systems, and thus achieve near ideal co-existing communication toward more efficient utilization of the spectrum. Maximum Likelihood (ML) has been introduced to cooperative, non-cooperative, mobile, and spatio-temporal spectrum sensing mechanisms. With the enhanced ML techniques, the intelligent spectrum sensing will play an essential role in co-existing radio networks.

Figure 9:
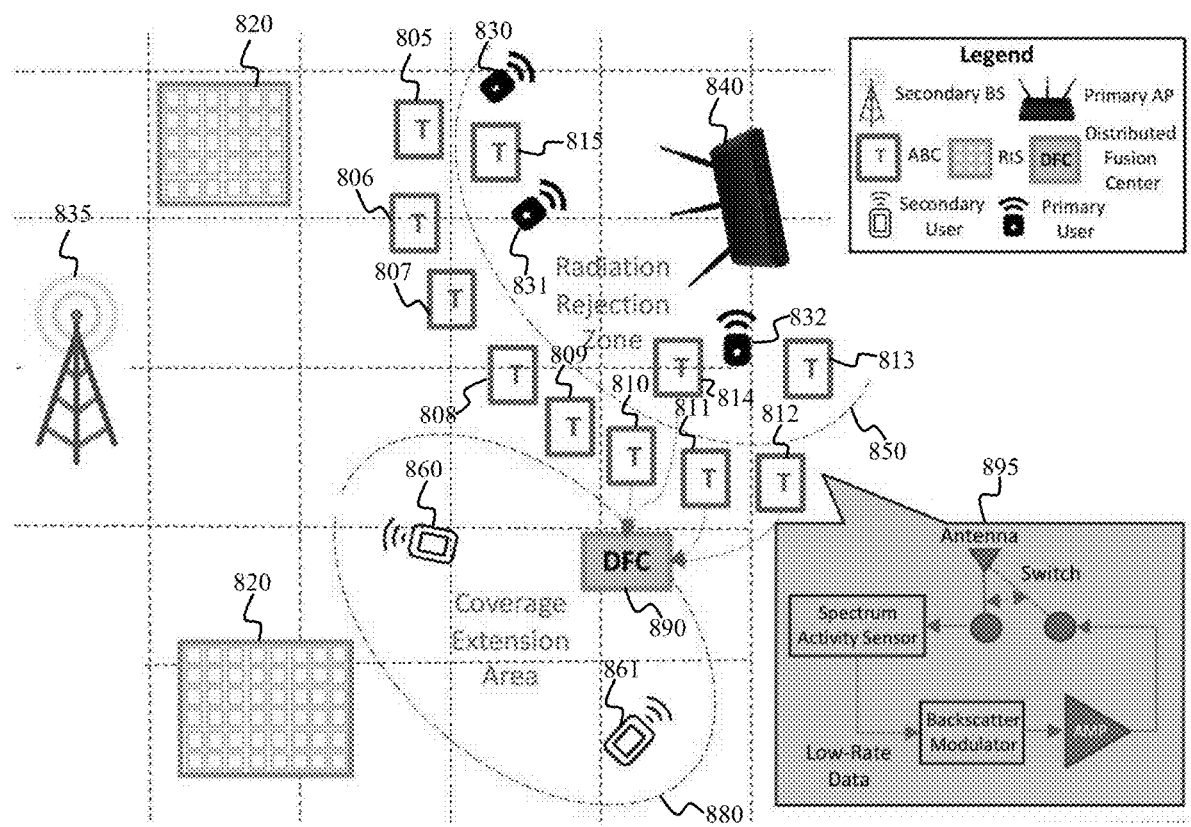
FIG. 9 illustrates a system structure including spectrum activity sensors to generate low-rate data that is transmitted via backscatter communication to a distributed fusion center (DFC) so that edge AI can forecast spectrum activities to dynamically adjust RISs in the system, in accordance with an embodiment of the present invention.

Cooperative spectrum sensing has been previously proposed but suffers from the extra communication from the sensors to the transmitter. The intuitive construction of the spectrum map inevitably requires cooperative spectrum activity sensors but keeps the spatial spectrum efficiency the same. A synthetic aperture radar leveraging antenna array to construct the spectrum map can see through its coverage but is not sufficient to establish the spectrum map for the entire region. Recalling the fact that each spectrum sensor only needs to transmit 1-bit information to construct the entire spectrum map, one can again take advantage of the use of multiple ABCs to form a smart spectrum sensor network to generate the entire spectrum map, as shown in FIG. 9. As the blue box 895, a spectrum sensor, senses the radio strength from the multiple ABCs 805-815 at certain frequency band(s) and translates it into a short data packet, which the spectrum information is decoded into 1, or just a few, bits to provide the capability of spectrum map construction for any frequency band. Such small data packets can leverage the ABCs 805-815 (with optional amplification depending on the operating needs) to be transmitted to a distributed fusion center (DFC) 290, when the RF switch turns to the transmission mode. In this way, the spectrum sensors can operate in a maintenance-free manner since the ABCs 805-815 may utilize energy harvesting, which resolves the device management dilemma of sensor networks. One may view the transmitter in FIG. 9 as the secondary BS 835 or the primary AP 840 in the radio-access network (RAN) of the secondary system, which has an edge server to analyze the sensor data to (i) construct the spectrum map (ii) control the RISs 820, 825 accordingly and possibly move the RISs 820, 825 dynamically. There are likely several DFCs 890 in the intended radio coverage region and DFCs 890 have battery-operating communication and computational capability. These DFCs can (i) send data to the secondary BS 835 to learn in a centralized manner, or (ii) exchange in a distributed ad hoc manner among them and the secondary BS 840, with privacy-preserving functionality. The primary users 830-832 in the radiation rejection zone 850 and the secondary users 860,861 in the coverage extension area 880 are also illustrated for reference.

Fundamentally, the construction of the spectrum map, based on the spectrum activity sensor data, may proceed by hypothesis testing or statistical classification, and two-dimensional estimation or regression. Due to potentially complex geometric properties, statistical classification is considered. Different machine learning (ML) techniques for cooperative spectrum sensing have been investigated in wireless IoT, HetNets, MIMO, D2D and NOMA networks. Generally, the goal of cooperative spectrum sensing is to determine the transmission opportunity at a single geographical location for point-to-point cognitive radio communication. On the contrary, the spectrum map to realize proposed multiple RISs technology provides the information to transmit the radio signals over a wide geographical area to serve multiple secondary co-existing users, much beyond a single point. After examining ML techniques and considering the fact that there is a lack of stationary data to construct the spectrum map that is designed to meet the needs of dynamic radio channels including interference, a support vector machine (SVM) derived from statistical learning appears to meet the initial purpose with partially known models of communication systems. Also, an SVM can even handle 1-bit sensor information to get satisfactory results, which is cumbersome for other ML techniques. Applying SVM to construct a 2D, or even 3D, spectrum map has a fundamental difference from spectrum sensing for point-to-point communication, while adopting linearly separable SVM. Even though the spectrum sharing concept has been studied for ABC networks, how to obtain the spectrum map and how to perform spectrum sensing via ABCs is not clear. Inspired by linear and nonlinear kernel SVM analysis for coverage boundary detection performed, the present invention explores ML aided spectrum map construction based on limited sensor information obtained via ambient (ABC) backscatter node communication, which is shown as efficient and thus helps to establish smart radio environment.

Mathematically, the spectrum activity data from the nth sensor forms the sensor data vector $x_n$. Based on the sensing spectrum value (e.g., radio signal strength, etc. at the target frequency band), the nth sensor can be classified as label $y_n$ indicating suitability for secondary communication ($y_n+1$) or unsuitability ($y_n-1$) at its location. For each geographical location of interest, the BS of the secondary system must predict its label (i.e., +1 or −1). In a geographical area of the secondary co-existing system, a hyperplane $a^T x+b=0$ to separate into a region (+1) and another region (−1). The goal of learning is to find a, b. For a 2-D area, this hyperplane is a line in a linearly separable SVM classification problem. Unfortunately, such a solution is obviously useless for spectrum map. To resolve this dilemma, the SVM classification of spectrum map can be modified into the Lagrange multiplier version as:

$$\mathcal{L} = \sum_{n=1}^{N} \lambda_n - \frac{1}{2}\sum_{i=1}^{N}\sum_{j=1}^{N} \lambda_i \lambda_j y_i y_j x_i^T x_j \tag{19}$$

The equivalent problem is to maximize $\mathcal{L}$ over $\lambda_n \geq 0$, subject to $$\sum_{n=1}^{N} \lambda_n y_n = 0,$$

which is known as the dual problem. Once we found the $\lambda_n$, n=1, ..., N, the dual version of this classifier for a new data point $x_{new}$ can be expressed as follows to classify $H_1$ and $H_0$ (i.e., permissible for co-existing secondary system to operate or not):

$$\sum_{n=1}^{N} \lambda_n y_n x_n^T x_{new} + b \gtrless 0 \tag{20}$$

The maximization of $\mathcal{L}$ will return almost all $\lambda_n$ as zero. Those who are not zero correspond to the support vectors that define the margins. Furthermore, the problem can be extended into the soft-margin problem as follows:

$$\mathcal{J} = \frac{1}{N}\sum_{n=1}^{N} \max\left[1 - y_n(a^T x_n + b), 0\right] + \lambda\|a\|^2 \tag{21}$$

where $\mathcal{J}$ consists of two terms which are loss function and regularization. $\lambda$ plays the role of weighting between margin size and whether it lies on the correct side of the margin or not. Since $\mathcal{J}$ is convex in a, the (stochastic) gradient decent method is suitable for finding the solution. As shown in FIG. 1, simple curve is still not enough for the desired co-existing utilization of spatial spectrum under complex propagation environments. Consequently, the radial basis function kernel, $$K(x, x') = \exp\left(-\frac{\|x - x'\|^2}{2\sigma^2}\right),$$

also known as Gaussian kernel, is introduced. Furthermore, transmission from all the sensors, all the time, consumes a lot of bandwidth. Therefore, each spectrum sensor shall decode the spectrum information into 1-bit (suitable for co-existing communication or not) according to compressed sensing.

There exists an advantage by 1-bit spectrum information, wherein the spectrum sensors around the area requiring high radiation rejection, such as that for radio astronomy, measure low spectrum activity and the raw data can mislead the construction of spectrum availability map. A straightforward solution is to present their values indicating unsuitable for co-existing communication, then using Gaussian kernel in equation (19).

As FIG. 10A illustrates the consequent construction of the spectrum map, it successfully forms the spectrum map indicating permissible region (suitable for secondary co-existing communication, in blue); but is not possible for effective utilization while the original spatial spectrum allows a large, connected region for the RIS technology. It is not because the Gaussian kernel only considers squared Euclidean distance, but instead, the Gaussian kernel equivalently considers higher order terms in inner product space to accommodate complex propagation channel dynamics. To resolve this challenge, further techniques are required. As SVM performance is sensitive to parameters, slack variables $\zeta_n$ are introduced for $x_n$, $y_n$, the soft penalization $$c_0 = \sum_{n=1}^{N} \zeta_n + \frac{1}{2}\lambda\|a\|^2.$$

Appropriate adjustment of parameters demonstrates accurate construction of the spectrum map as shown in FIG. 10B.

It is anticipated that 6G wireless systems will host much more diverse applications, compared to 5G networks, including holography, AR/VR assisted meta-verse, joint radar-sensing and communication, non-terrestrial networks, ultra-high speed railway networks. These networks will be in the same environment which are constantly interfering with each other. Repositionable dynamic RIS and multiple coordinated ABC assisted smart radio environment as described by the present invention will be the remedy for highly overloaded future networks in order to operate them under the minimal interference conditions by providing 3D electromagnetic radiation control over the environment.

Placement of the ambient backscatter (ABC) nodes to fade the radiation from secondary co-existing systems can be a critical extension when the location of the BS and RISs are known. Further robust placement without precise knowledge of the BS and RISs locations, simply based on the required radiation (spatial spectrum) rejection from the secondary system, serves the ultimate goal. Calculation and proof of essential performance limits of RIS and ABC assisted networks are needed.

Once the DFC obtains data from the spectrum sensors, learning to classify can be facilitated in two possible architecture: (i) hierarchical architecture, wherein the DFCs send the data to the BS for centralized learning and then construct the spectrum map; (ii) ad hoc architecture, wherein the DFCs and BS exchange data in an ad hoc manner for distributed learning and constructing the spectrum map. One of the purposes of a distributed architecture is to avoid longer distance transmission consuming a lot of spatial spectrum. For the purpose of spatial bandwidth efficiency and privacy-preserving for data, a disruptive application of federated learning (FL) is proposed for spectrum map construction. Instead of transmitting the data, stochastic gradient descent (SGD) parameters of SVM can be relayed either hierarchically or in an ad hoc manner. This falls into the vertical FL. Only exchanging learning parameters, rather than the spectrum sensing data, further minimizes spectrum use for co-existing systems while achieving privacy-preserving and cybersecurity against data interception. Pros and cons of FL, compared with traditional sensor data transmission, needs to be exploited using single or multi-channel parallel transmission for further studies.

The various embodiments of the present invention provide a smart radio environment that shapes the electromagnetic energy in the spatial domain using channel control mechanisms such as repositionable dynamic RISs and multiple coordinated ABCs, which is analogous to pulse shaping in the time and frequency domain. The advantage of multiple static RISs is described to increase the coverage area of secondary users, and the novel property concept of repositionable dynamic RISs is introduced to provide more robustness to shadowing and power fluctuations in a short time frame. It is shown that the proposed concept introduces 15% more coverage to the secondary systems. Additionally, multiple ABCs are utilized to create radiation rejection zone for the use of primary users. The performance of the proposed structure is demonstrated with 2D intensity maps. Also, ML assisted spatial spectrum activity on the geographical map is demonstrated utilizing ABC sensors to manage the use of repositionable dynamic RISs. Combining these phenomena, pulse shaping like spatial domain electromagnetic radiation control concept is created.

The present invention may be embodied on various telecommunication and networking systems that connects multiple transceivers and users smoothly, especially next generation 6G wireless communication systems and Wi-Fi technologies to boost the received signal quality. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is also to be understood that the following claims are intended to cover all of the generic and specific features of the invention herein described, and all statements of the scope of the invention which, as a matter of language, might be said to fall therebetween.

What is claimed is:

1. A method for controlling electromagnetic radiation in a geographical area, the method comprising:
    generating, by a primary wireless system positioned in a geographical area, a primary electromagnetic signal for primary users within a primary use region of the geographical area;
    transmitting, by the primary wireless system, the primary electromagnetic signal into the primary use region of the geographical area;
    generating, by a secondary wireless system positioned in the geographical area, a secondary electromagnetic signal for secondary users within a secondary use region of the geographical area;
    transmitting, by the secondary wireless system, the secondary electromagnetic signal into the secondary use region of the geographical area;
    forming, by at least one-microcontroller, an ambient backscatter communication (ABC) antenna array comprising antenna of a plurality of ABC nodes positioned in close proximity to the primary use region of the geographical area;
    receiving, at the ABC antenna array, the secondary electromagnetic signal;
    generating, by the at least one micro-controller, an adjusted secondary electromagnetic signal by adjusting one or more of a phase and amplitude of the secondary electromagnetic signal received at the ABC antenna array; and transmitting, by the ABC antenna array, the adjusted secondary electromagnetic signal into the primary use region, wherein transmission of the adjusted secondary electromagnetic signal by the ABC antenna array into the primary use region decreases interference of the primary electromagnetic signal by the secondary electromagnetic signal for the primary users within the primary use region.

2. The method of claim 1, wherein each of the plurality of ABC nodes are positioned in close proximity to the primary use region.

3. The method of claim 1, wherein the ABC antenna array comprises a transmit antenna array and a receive antenna array, and wherein the secondary electromagnetic signal is received at the receive antenna array and the adjusted secondary electromagnetic signal is transmitted from the transmit antenna array into the primary use region.

4. The method of claim 1, further comprising:

receiving, by one or more repositionable dynamic reconfigurable intelligent surfaces (RISs) positioned in the geographical area, a secondary magnetic signal;

scattering, by the one or more RISs positioned in the geographical area, the secondary electromagnetic signal, wherein scattering the secondary electromagnetic signal increases coverage of the secondary electromagnetic signal for the secondary users within the secondary use region.

5. The method of claim 4, wherein each of the one or more repositionable dynamic RISs comprises an array of reflecting elements, and wherein scattering the secondary electromagnetic signal further comprises mitigating one or more of pathloss, fading, blockage and multipath effects of the secondary electromagnetic signal to increase the coverage of the secondary electromagnetic signal for the secondary users within the secondary use region.

6. The method of claim 4, scattering the secondary electromagnetic signal further comprises repositioning the one or more repositionable dynamic RISs to control time varied shadowing effects within the secondary use region.

7. The method of claim 6, wherein the one or more repositionable dynamic RIS are repositioned along one dimension and at a predetermined speed.

8. The method of claim 4, further comprising:

constructing a spectrum map of the geographical area using the plurality of ABC nodes; and using the spectrum map to control the repositionable dynamic RISs.

9. A method for controlling electromagnetic radiation in a geographical area, the method comprising:

generating, by a primary wireless system positioned in a geographical area, a primary electromagnetic signal for primary users within a primary use region of the geographical area;

transmitting, by the primary wireless system, the primary electromagnetic signal into the primary use region of the geographical area;

generating, by a secondary wireless system positioned in the geographical area, a secondary electromagnetic signal for secondary users within a secondary use region of the geographical area;

transmitting, by the secondary wireless system, the secondary electromagnetic signal into the secondary use region of the geographical area;

forming, by at least one micro-controller, an ambient backscatter communication (ABC) antenna array comprising antenna of a plurality of ABC nodes positioned in close proximity to the primary use region of the geographical area;

receiving, at the ABC antenna array, the secondary electromagnetic signal;

generating, by the at least one micro-controller, an adjusted secondary electromagnetic signal by adjusting one or more of a phase and amplitude of the secondary electromagnetic signal received at the ABC antenna array; and transmitting, by the ABC antenna array, the adjusted secondary electromagnetic signal into the primary use region, wherein transmission of the adjusted secondary electromagnetic signal by the ABC antenna array into the primary use region decreases interference of the primary electromagnetic signal by the secondary electromagnetic signal for the primary users within the primary use region; and receiving, by one or more repositionable dynamic reconfigurable intelligent surfaces (RISs) positioned in the geographical area, the secondary electromagnetic signal;

scattering, by the one or more RISs positioned in the geographical area, the secondary electromagnetic signal, wherein scattering the secondary electromagnetic signal increases coverage of the secondary electromagnetic signal for the secondary users within the secondary use region.

10. The method of claim 9, further comprising:

constructing a spectrum map of the geographical area using the plurality of ABC nodes; and using the spectrum map to control the repositionable dynamic RISs.

11. A system for controlling electromagnetic radiation in a geographical area, the system comprising:

a primary wireless system positioned within a geographical area, the primary wireless system comprising one or more antenna to generate a primary electromagnetic signal for primary users within a primary use region of the geographical area and to transmit the primary electromagnetic signal into the primary use region of the geographical area;

a secondary wireless system positioned within the geographical area, the secondary wireless system comprising one or more antenna to generate a secondary electromagnetic signal for secondary users within a secondary use region of the geographical area and to transmit the secondary electromagnetic signal into the secondary use region of the geographical area;

a plurality of ambient backscatter communication (ABC) nodes positioned within the primary use region of the geographical area, wherein each of the ABC nodes comprises at least one antenna;

at least one micro-controller in communication with the plurality of ABC nodes, the at least one micro-controller to form an ABC antenna array comprising the antenna of the plurality of ABC nodes;

the ABC antenna array to receive a secondary electromagnetic signal transmitted from a secondary wireless system operating within the geographical area;

the at least one micro-controller to generate an adjusted secondary electromagnetic signal by adjusting one or more of a phase and amplitude of the secondary electromagnetic signal received at the ABC antenna array; and the ABC antenna array to transmit the adjusted secondary electromagnetic signal into the primary use region, wherein transmission of the adjusted secondary electromagnetic signal by the ABC antenna array into the primary use region decreases interference of the primary electromagnetic signal by the secondary electromagnetic signal for the primary users within the primary use region.

12. The system of claim 1, wherein each of the plurality of ABC nodes are positioned in close proximity to the primary use region.

13. The system of claim 11, wherein the ABC antenna array comprises a receive antenna array to receive the secondary electromagnetic signal and a transmit antenna array to transmit the adjusted secondary electromagnetic signal into the primary use region.

14. The system of claim 11, further comprising:
one or more repositionable dynamic reconfigurable intelligent surfaces (RISs) positioned within the geographical area, the one or more repositionable dynamic RISs to receive the secondary electromagnetic signal and to scatter the secondary electromagnetic signal, wherein scattering the secondary electromagnetic signal increases coverage of the secondary electromagnetic signal for the secondary users within the secondary use region.

15. The system of claim 14, wherein the one or more repositionable dynamic RISs are repositioned within the one or more repositionable dynamic RISs to control time varied shadowing effects within the secondary use region.

16. The system of claim 14, further comprising:
a spectrum map of the geographical area constructed using the plurality of ABCs; and
at least one distributed fusion center (DFC), the at least one DFC to use the spectrum map to control the repositionable dynamic RISs.

* * * * *